(12) United States Patent
Ochiai

(10) Patent No.: US 6,227,922 B1
(45) Date of Patent: *May 8, 2001

(54) EXHAUST TIMING CONTROL VALVE CONTROL ARRANGEMENT

(75) Inventor: Nobuyuki Ochiai, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/259,495

(22) Filed: Feb. 26, 1999

Related U.S. Application Data

(63) Continuation-in-part of application No. 08/950,699, filed on Oct. 15, 1997, now Pat. No. 5,934,958.

(30) Foreign Application Priority Data

Feb. 28, 1998 (JP) .................................................. 10-064690

(51) Int. Cl.⁷ .................................................... B63H 21/32

(52) U.S. Cl. ........................................ 440/89; 123/65 PE

(58) Field of Search ........................... 60/324; 123/65 PE; 440/89, 1, 2, 47

(56) References Cited

U.S. PATENT DOCUMENTS

| | | |
|---|---|---|
| 4,121,552 | 10/1978 | Mithuo et al. . |
| 4,202,297 | 5/1980 | Oku et al. . |
| 4,285,311 | 8/1981 | Iio . |
| 4,321,893 | 3/1982 | Yamamoto . |
| 4,325,335 | 4/1982 | Shibata . |
| 4,333,431 | 6/1982 | Iio et al. . |
| 4,341,188 | 7/1982 | Nerstrom . |
| 4,364,346 | 12/1982 | Shiohara . |
| 4,368,703 | 1/1983 | Shibata . |
| 4,388,894 | 6/1983 | Tanaka et al. . |
| 4,397,272 | 8/1983 | Omote . |
| 4,516,540 | 5/1985 | Nerstrom . |
| 4,671,220 | 6/1987 | Inoue et al. . |
| 4,793,347 | 12/1988 | Taniuchi et al. . |
| 4,909,193 | 3/1990 | Boyesen . |
| 4,957,664 | 9/1990 | Kohno et al. . |
| 4,986,780 | 1/1991 | Sougawa . |
| 4,998,512 | 3/1991 | Masuda et al. . |
| 5,000,131 | 3/1991 | Masuda . |
| 5,018,503 | 5/1991 | Hoshiba et al. . |
| 5,063,887 | 11/1991 | Ozawa et al. . |
| 5,063,888 | 11/1991 | Ozawa et al. . |
| 5,094,217 | 3/1992 | Kaku et al. . |
| 5,183,013 | 2/1993 | Ito et al. . |
| 5,190,006 | 3/1993 | Motoyama et al. . |
| 5,190,148 * | 3/1993 | Williams ........................... 200/43.08 |
| 5,212,949 | 5/1993 | Shiozawa . |
| 5,220,890 | 6/1993 | Koriyama . |
| 5,240,649 | 8/1993 | Yamada et al. . |
| 5,322,044 | 6/1994 | Maebashi . |
| 5,400,755 | 3/1995 | Maebashi . |
| 5,410,993 | 5/1995 | Masuda et al. . |
| 5,537,958 | 7/1996 | Nishimura et al. . |
| 5,575,246 | 11/1996 | Ito . |
| 5,588,402 * | 12/1996 | Lawrence ......................... 123/65 PE |
| 5,598,813 | 2/1997 | Masuda et al. . |
| 5,605,119 | 2/1997 | Masuda et al. . |

(List continued on next page.)

Primary Examiner—Ed Swinehart
(74) Attorney, Agent, or Firm—Knobbe, Martens, Olson & Bear, LLP

(57) ABSTRACT

An engine has an exhaust control valve which is moved by a control system according to a predetermined control strategy. The control system obtains data from sensors that help the control system to identify certain characteristics of engine operating conditions. The control strategy involves cycling the exhaust control valve under predetermined engine operating conditions to clean the surface of the valve while reducing the impact of the cycling on engine performance. The cycling generally occurs during engine start-up and following engine shutdown. The cycling may be aborted during periods of rapid acceleration.

40 Claims, 14 Drawing Sheets

U.S. PATENT DOCUMENTS

| | | |
|---|---|---|
| 5,660,152 | 8/1997 | Masuda . |
| 5,709,177 | 1/1998 | Worth et al. . |
| 5,715,794 | 2/1998 | Nakamura et al. . |
| 5,782,214 | 7/1998 | Nanami et al. . |
| 5,934,958 * | 8/1999 | Ochiai ................................... 440/89 |
| 5,997,373 * | 12/1999 | Asai et al. ............................. 440/89 |

\* cited by examiner

EXHAUST TIMING CONTROL VALVE CONTROL ARRANGEMENT

RELATED APPLICATIONS

This application is a continuation-in-part of U.S. patent application Ser. No. 08/950,699, which was filed on Oct. 15, 1997, and which issued as U.S. Pat. No. 5,934,958 on Aug. 10, 1999, which claimed priority under 35 U.S.C. § 119 to Japanese Patent Application No. Hei 8-294,365, filed on Oct. 15, 1996.

BACKGROUND OF THE INVENTION

1. Field of the Invention

The present invention generally relates to exhaust control valves for an engine. More specifically, the present invention relates to an exhaust control valve control arrangement that provides an exhaust valve cleaning mode which reduces the likelihood of such valves sticking as a result of use.

2. Description of Related Art

Conventional two-stroke engines generally include an exhaust port provided in each cylinder wall such that spent gases are exhausted through the exhaust port as the piston reciprocates in the cylinder. Exhaust port timing has an important effect on engine performance. Optimum exhaust port timing is dependent, in part, upon engine speed. For instance, to provide an improved engine performance, the exhaust port timing can be advanced during high-speed engine operation relative to the exhaust port timing during engine idling.

One manner of controlling the exhaust port timing is to employ exhaust control valves. Generally, these valves are of the sliding or rotating type, and do not serve to ever completely close the opening or port in each combustion chamber in two-stroke applications. Instead, each valve moves between a first position, in which the valve does not obstruct, or obstructs very little of, the exhaust port, and a second position, in which the valve partially obstructs the port. Therefore, the exhaust control valve can alter the effective cross-sectional area of the exhaust port by appearing to lower an upper surface of the exhaust port, thereby restricting the flow through the exhaust port. The movement of the valves also alters the timing of the opening and closing of the exhaust ports.

By extending the exhaust control valve into the exhaust port, it is possible to operate the engine under a higher compression ratio under low-load and low-speed conditions to improve engine performance. It is also possible to reduce the compression ratio under high-speed and high-load conditions by retracting the exhaust control valve to avoid excess pressures in the combustion chamber and pre-ignition or knocking conditions. Furthermore, closing the exhaust control valve during starting can raise the compression ratio and facilitate starting. Hence, these types of exhaust control valves are extremely effective in improving the performance of a two-stroke engine under particularly difficult running conditions without sacrificing performance under other running conditions.

There is a difficulty in conjunction with these valves however. Because the exhaust control valve is subject to exhaust gas temperatures, there must be adequate clearance provided between the valve and its surrounding structure to permit the valve to slide or rotate freely between its opened and closed positions. Of course, this clearance cannot be so great as to cause pressure leakage. In addition, because of the different materials typically employed for the exhaust control valve and the engine casting, in which the valve is mounted, compensation for differing degrees of thermal expansion is necessary. Accordingly, the clearances may actually be less when the engine is cold than when it is warm. Therefore, when the engine is started, before the engine is warmed-up, the valves are more prone to sticking.

Moreover, because these valves have a relatively small range of movement, and are not continuously moved, they may seize within the guide passage in which they are mounted. In addition, because oil may be present in the exhaust gases of two cycle engines, the oil can cause a further problem once the engine is shut off. While the engine is running, the temperature will be high enough to avoid carbonization on the valve. However, as a stopped engine cools, residual oil may carbonize, or coke, on the control valve and form deposits. These deposits, along with other foreign matter, such as sea-salt for instance, make it difficult to operate the valve when the engine is restarted. In short, these deposits tend to inhibit a smooth operation of the valve. Of course, the aforementioned differential thermal expansions will also further aggravate this situation.

SUMMARY OF THE INVENTION

It has been suggested to exercise the exhaust control valves through a number of cycles between an opened and a closed position to clean any scale, carbon deposits or other debris from the exhaust control valve. However, the cycling of the exhaust control valve presents problems in and of itself. For instance, if the exhaust control valve is being cycled through a large range of movement while the engine is under acceleration, the effective compression ratio of the engine is also being altered throughout the movement of the valve and during the acceleration of the watercraft. This can result in uneven acceleration as well as an uncomfortable ride.

Thus, an exhaust control valve control arrangement is desired that can be used in an engine for powering a watercraft. The control should be reliable and easy to maintain. Moreover, it is desired to have a cleaning operation for exhaust control valves, which does not significantly detract from the performance characteristics of the watercraft engine during rapid acceleration.

In accordance with one feature of the present invention, the exhaust control valve prioritizes engine acceleration over exhaust valve cleaning. For instance, the cleaning is performed during start-up and shutdown but not while the watercraft rapidly accelerates to attain a planing velocity. In addition, if the throttle is suddenly fully opened, then any cleaning operation in progress at that time is ceased.

Another feature of the present invention provides an improved exhaust control valve system and method of operating the same. Additionally, an exhaust control valve system configured in accordance with the present invention desirably provides a method for cleaning an exhaust control valve under at least some conditions that may reduce the possibility of valve sticking on start up and during low-temperature operation. Moreover, the exhaust control valve system preferably prioritizes the acceleration of the engine over the cleaning operation.

Accordingly, one aspect of the present invention involves a watercraft having an engine powering a water propulsion unit. The engine includes a starter motor, an exhaust port leading from a combustion chamber through which the exhaust products may be transported and an exhaust valve cooperable with the exhaust port. The exhaust valve is movable between a first position, in which the closing of the exhaust port is delayed, and a second position, in which the closing of the exhaust port is advanced. The watercraft also has a control unit powered by a power source and a drive control for moving the exhaust valve at least partially between the first position and the second position in an exhaust cleaning operation. The control unit activates the drive control after the starter motor is engaged and before the engine attains a first predetermined speed so as to cycle the exhaust control valve. The control unit deactivates the drive control after the engine attains a second predetermined speed so as to disable controlled movement of the exhaust control valve.

Another aspect of the present invention involves a watercraft having an engine powering a water propulsion unit. The engine includes a starter motor and an exhaust port leading from a combustion chamber through which the exhaust products may be transported. The engine also has an exhaust valve cooperable with the exhaust port which is movable between a first position, in which the closing of the exhaust port is delayed, and a second position, in which the closing of the exhaust port is advanced. The watercraft also has a control unit which is in electrical communication with a drive control. The drive control is capable of moving the exhaust valve at least partially between the first position and the second position in an exhaust cleaning operation. The control unit desirably activates the drive control before the engine attains a first predetermined speed so as to cycle the exhaust control valve.

An additional aspect of the present invention involves an exhaust control for an exhaust valve of an internal combustion engine. The engine includes at least one combustion chamber and an intake passage leading to the combustion chamber for providing air thereto. The engine also has a fuel supply for supplying fuel to the combustion chamber and an exhaust port leading from the combustion chamber for routing exhaust products therefrom. The valve desirably cooperates with the exhaust port and is movable between a first position, in which the closing of the exhaust port is delayed, and a second position, in which the closing of the exhaust port is advanced. The exhaust control includes means for moving the valve between the first and second positions and control means for moving the valve in a cleaning operation at least partially between the first and second positions when the engine is running at a speed below a predetermined speed.

A further aspect of the present invention involves an engine having at least one combustion chamber with an exhaust port leading therefrom. An exhaust port timing control valve is provided in the port at an upper portion thereof. Desirably, the valve can be moved between a projected position wherein it is projected into the exhaust port and covers at least the upper portion of the exhaust port and a retracted position in which it is retracted from the exhaust port. A drive control is provided that is capable of moving the valve and a main control is also provided that is capable of controlling the drive control between on and off states. The main control operates the drive control in a cleaning mode and a regular valve operation mode and the control unit initiates a valve cleaning mode in which the valve is moved between its projected and retracted positions by the drive control when a speed of the engine after starting exceeds a predetermined low speed but is below a predetermined high speed.

Another aspect of the present invention involves a method of cleaning an exhaust control valve of an engine. The engine has a lanyard switch, a start switch and at least one combustion chamber. An exhaust passage leads from the chamber. The exhaust control valve cooperates with the passage. The method involve determining if the lanyard switch is in an on position and determining if the start switch is in the on position. Once both of these switches are in an on position, the method determines if the engine speed exceeds a first predetermined speed. If so, the valve is moved in a cleaning operation between at least partially between a first position in which the valve does not obstruct the passage and a second position in which the valve at least partially obstructs the passage in order to clean the valve.

BRIEF DESCRIPTION OF THE DRAWINGS

These and other features of the invention will now be described with reference to the drawings reflecting several aspects of a preferred embodiment. The drawings are intended to illustrate, and not to limit, the invention and are described as follows.

DETAILED DESCRIPTION OF THE PREFERRED EMBODIMENTS OF THE INVENTION

The present invention generally relates to an engine powering a planing-type boat, such as a personal watercraft.

Specifically, the invention relates to a control strategy for an exhaust control valve associated with the engine powering the boat.

Figure 1:
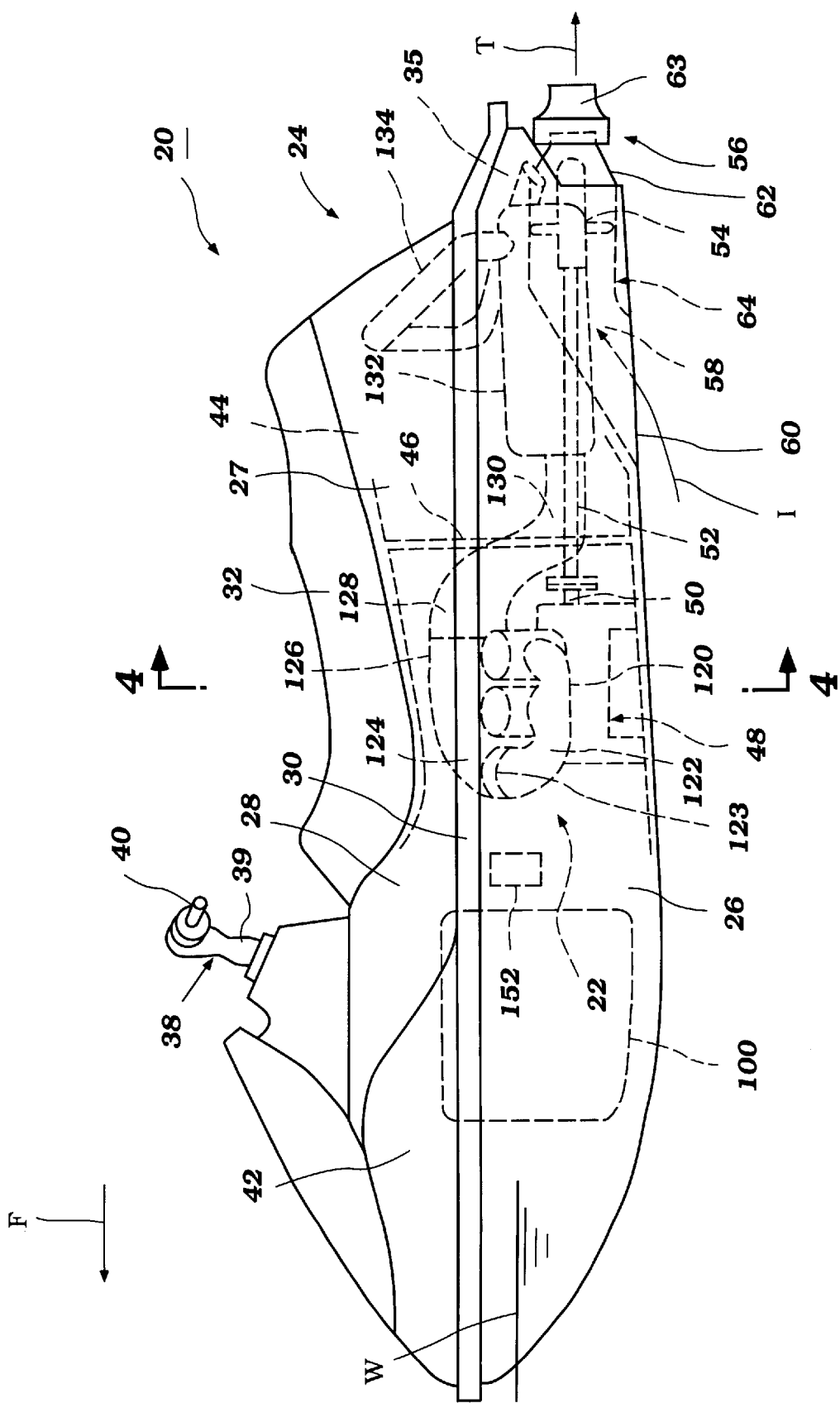
FIG. 1 is a side view of an exemplary personal watercraft environment powered by an engine which utilizes an exhaust control valve control system having features and advantages in accordance with the present invention, an engine and other watercraft components positioned within the watercraft being illustrated in phantom.
Figure 2:
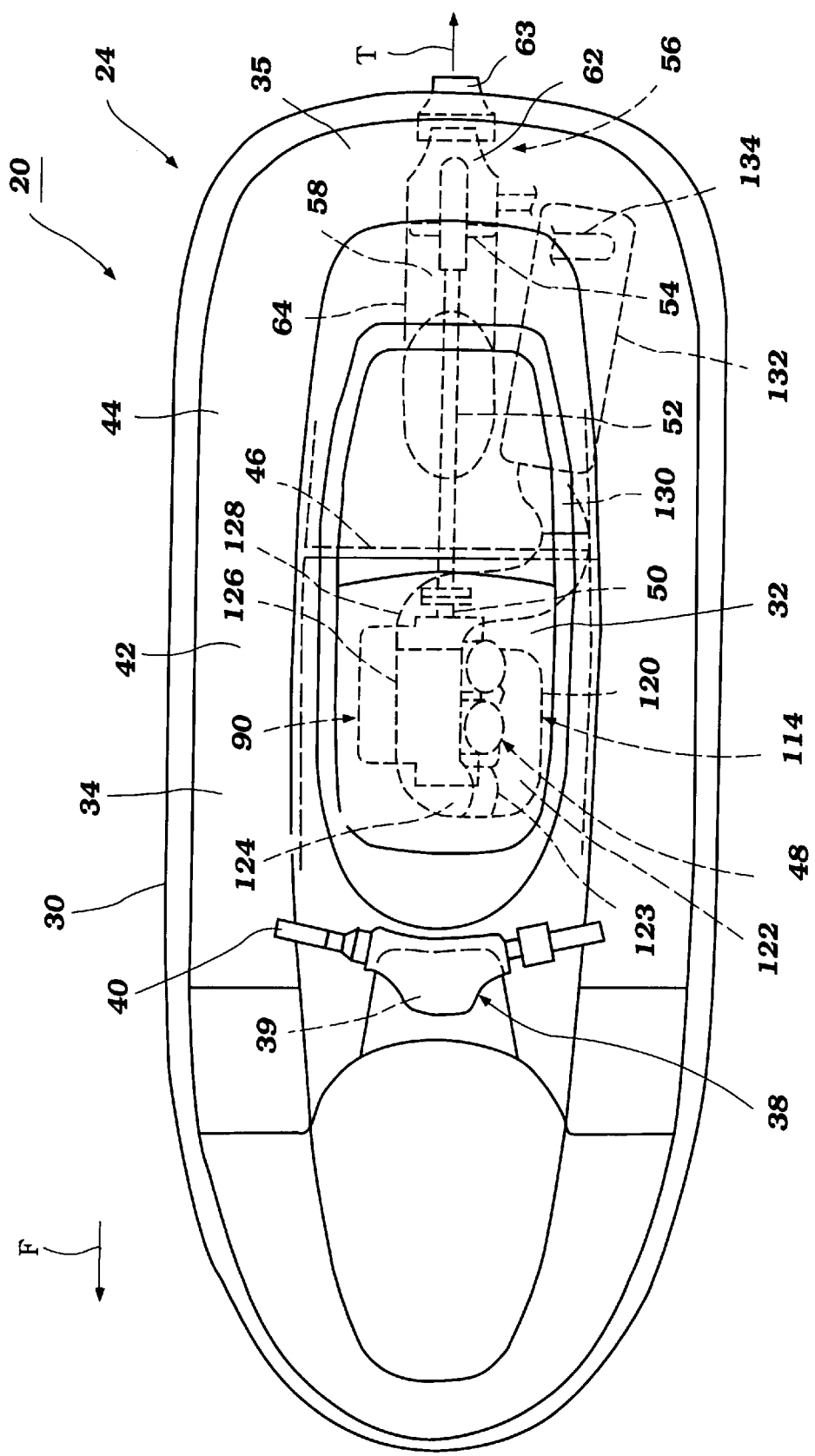
FIG. 2 is a top view of the exemplary personal watercraft environment illustrated in FIG. 1, with the engine and other components positioned within the watercraft being illustrated in phantom.

FIGS. 1 and 2 illustrate an exemplary watercraft 20. This environment is merely exemplary, as the present invention is useful with a variety of other watercraft and land vehicles. The watercraft 20 is desirably operated in a body of water designated by reference letter W. In use, the watercraft 20 is propelled through the body of water W in a forward direction, as designated by the arrow F in FIGS. 1 and 2. While being propelled forward, the personal watercraft 20 is capable of moving from the position shown in FIG. 1 to a planing position. The planing position is attained at a watercraft velocity associated with an engine speed referred to herein as "planing speed."

The watercraft body 24 generally comprises a hull 26 and a deck 28. A bond flange 30 is defined as the overlapping mating section where the hull 26 and the deck 28 are joined together. The bond flange 30 also identifies the location of a bond line, which is an imaginary line around the watercraft 20 where the hull 26 and the deck 28 are joined together. Accordingly, the deck 28 generally comprises the upper structural body of the watercraft 20, which is located above and includes the upper bond flange 30.

A seat 32 is positioned on a raised pedestal portion of the deck 28 that is defined in part by a wrapping sidewall 27. The seat 32 may be connected to a removable deck member (not shown) in a known fashion. With reference to FIG. 1, the seat 32 desirably extends longitudinally along the watercraft body 24 in a fore-aft direction. In this fashion, the seat 32 is designed to be straddled by an operator such that the operator places one leg on either side of the seat 32. The straddle-type seat 32 is characteristic of personal watercraft (i.e., a class of watercraft defined, in part, as having an operator that sits, stands or kneels, on, instead of in, the watercraft 20).

Figure 3:
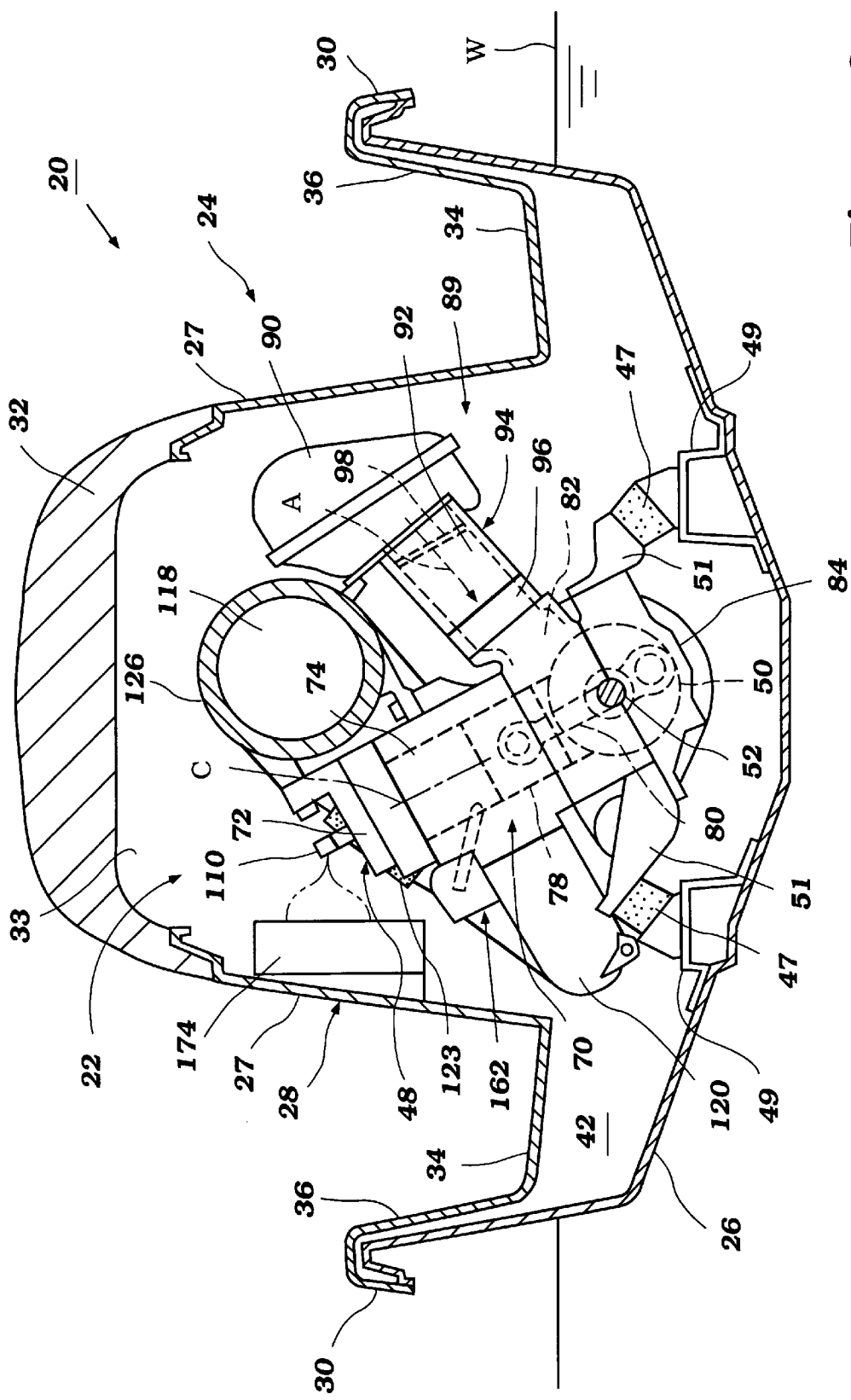
FIG. 3 is a cross-sectional end view of the exemplary watercraft environment illustrated in FIG. 1, with the engine and a portion of an exhaust system being illustrated in cross-section.

With reference to FIG. 3, a pair of footwells 34 define a platform area where the operator's feet may be placed. The footwells 34 desirably extend between a front portion of the watercraft 20 through an open stern portion of the watercraft 20 to a boarding platform 35.

Both the footwells 34 and the boarding platform 35 may be provided with a traction mat or a traction pad (not shown). A traction mat is a thin rubber material bonded to the footwells 34 or boarding platform 35 of the watercraft 20. A traction pad is a thick rubber material bonded to the footwells 34 or the boarding platform 35 of the watercraft 20. These elements result in increased traction for the operator as splashing water tends to decrease the level of traction available without any sort of traction pad or mat.

An operator may climb onto the watercraft 20 through the open stern of the watercraft. The two footwells 34 and the boarding platform 35, in combination with the deck 28 and a pair of gunwales 36, define the opening in the stern. The gunwales 36 are vertical walls that surround the tray or footwells 34 of the personal watercraft 20, and are clearly depicted in FIG. 3.

With reference again to FIGS. 1 and 2, a steering mechanism 38 is arranged forward of the forward end of the longitudinally extending straddle-type seat 32. The steering mechanism 38 is designed to allow the operator to control the direction or tack of the watercraft 20 through the body of water W in which the watercraft 20 is being operated. Moreover, the steering mechanism 38 preferably includes a steering stem 39 and a throttle control 40. As will be recognized by those of skill in the art, the throttle control 40 can be any number of mechanisms designed to control a throttle valve associated with the engine. For instance, the throttle control 40 can be a rotatable grip actuator, such as commonly used on motorcycles, a thumb throttle actuator, which is a throttle actuating lever mounted on a handlebar and operated with the thumb, similar to a trigger or paddle throttle actuator, or any other suitable type of actuator.

With reference again to FIG. 1, the hull 26 in cooperation with the deck 28 form a number of internal compartments which generally include an engine compartment 42 and a pumping chamber 44. As is known by those of skill in the art, a bulkhead 46 may define a division between the engine compartment 42 and the pumping chamber 44 or any other compartments defined within the watercraft body 24. Desirably, the bulkhead 46 is a structural reinforcement that is built into the watercraft's body 24.

Figure 4:
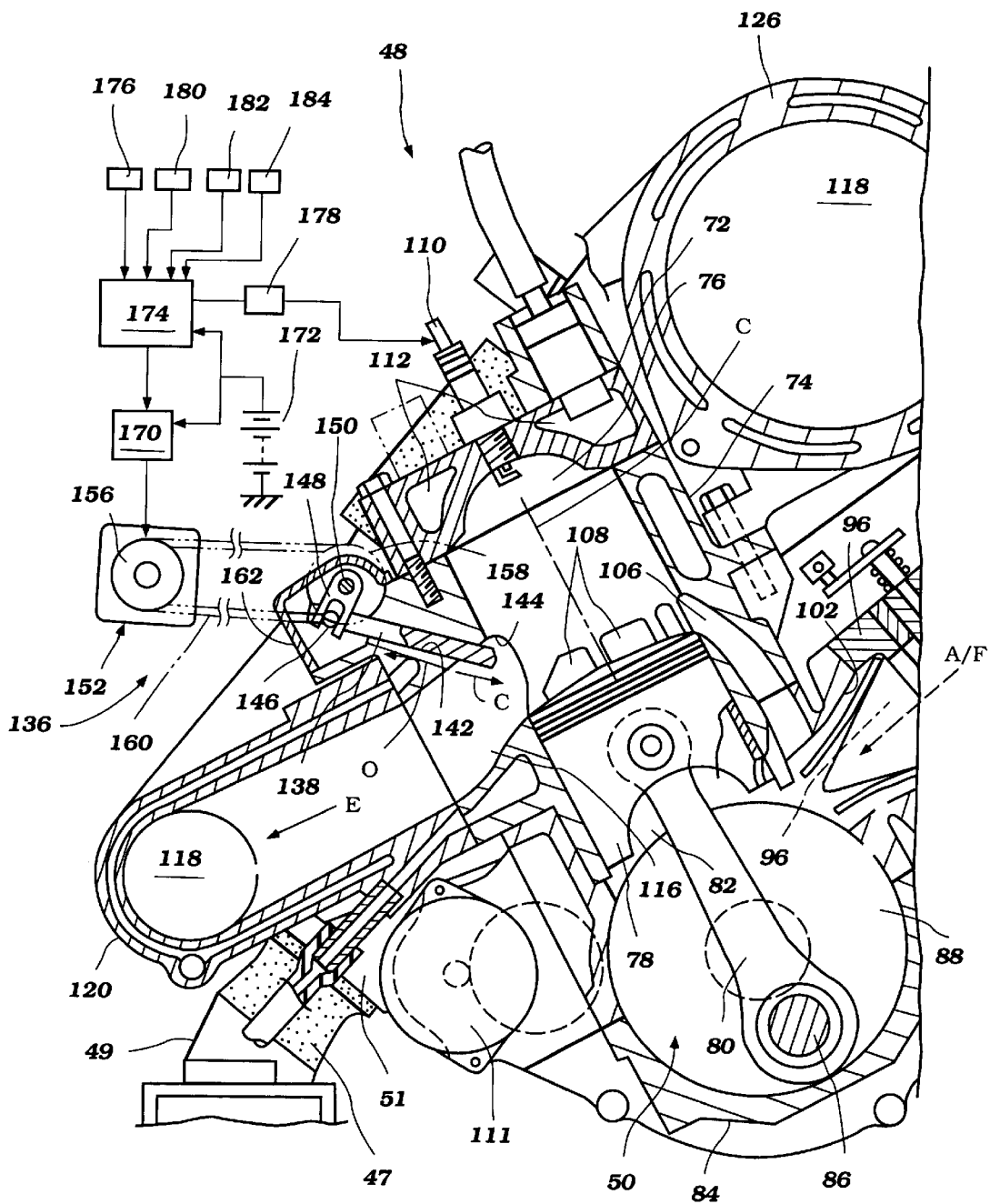
FIG. 4 is an enlarged cross-sectional end view of a portion of the engine of FIG. 3, taken along the line 4—4 therein, illustrating the engine and an exhaust control valve and valve control thereof.
Figure 5:
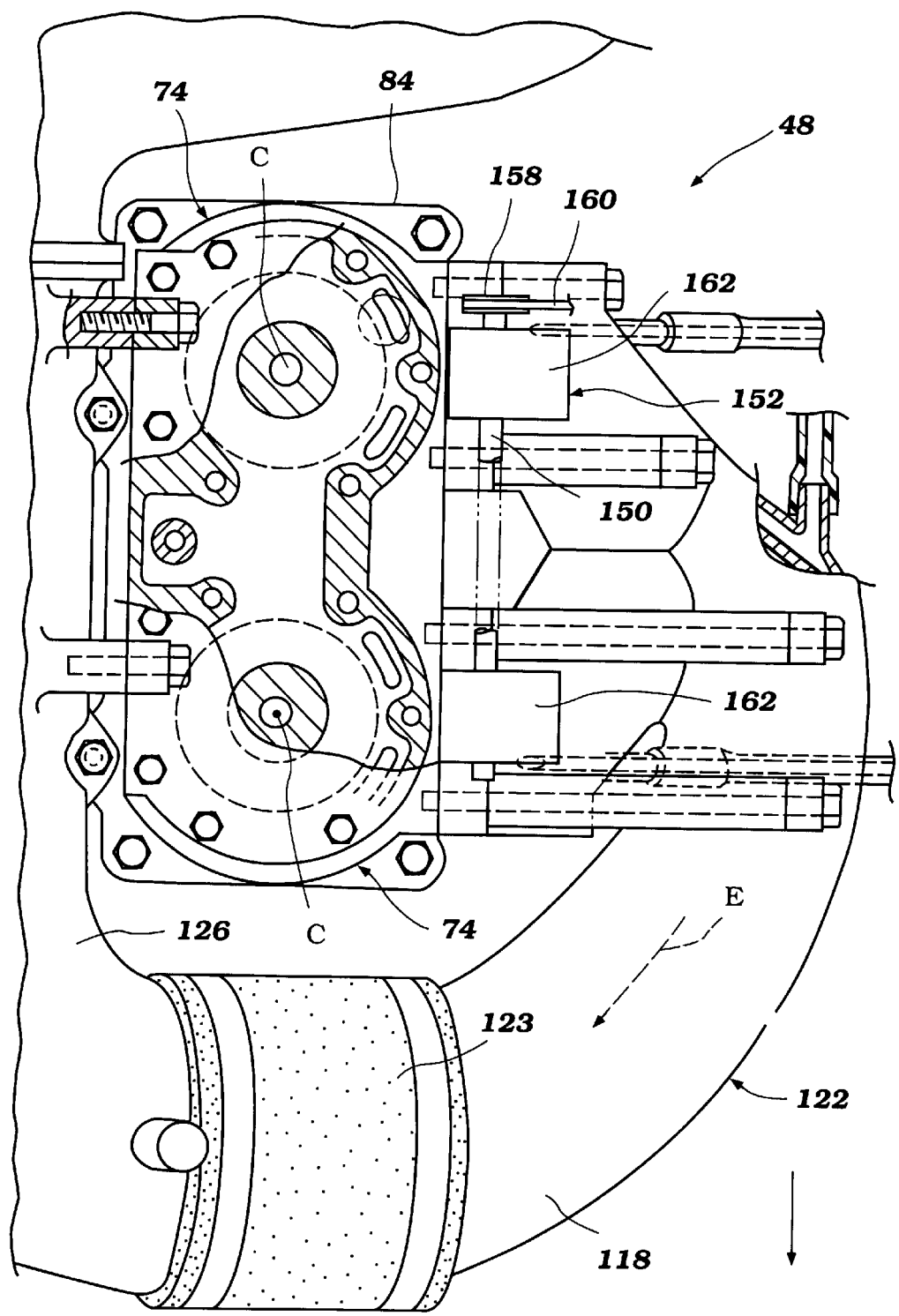
FIG. 5 is a cross-sectional top plan view of the engine of FIG. 3.

An engine 48 is positioned within the engine compartment 42. With reference to FIGS. 3 and 4, the engine 48 is connected to the hull 26 via several engine mounts 47. The engine mounts 47 are connected to a bottom of the hull 26 in a known fashion. For instance, with reference to FIG. 3, the engine mounts 47 are connected to a pair of stringers 49, which are connected to the bottom of the hull 26. The engine mounts 47 are also connected to the engine 48 through a set of engine plates 51, in a known fashion. Thus, the engine 48 is connected to engine plates 51, which are, in turn, connected to engine mounts 47, which are positioned along stringers 49 that run along the bottom surface of the hull 26. Because the engine mounts 47 preferably comprise resilient members, mounting the engine 48 in the aforedescribed manner reduces the transfer of engine vibrations through the hull to the operator.

Desirably, the engine 48 is at least partially accessible through a maintenance opening 33. The maintenance opening 33 is preferably accessible by removing the removable deck member (not shown) on which the seat 32 is mounted.

The engine 48 is best illustrated in FIG. 3. As illustrated therein, the engine 48 is preferably of the two cylinder, two cycle variety. Of course, the engine 48 may have as few as one, or more than two, cylinders and operate in accordance with other operating cycles, as may be appreciated by one of skill in the art.

As illustrated in FIG. 1, the engine 48 has a crankshaft 50 that ultimately drives an impeller shaft 52 through known connections. The impeller shaft 52 is joined to an impeller 54 or a similar structure. The impeller 54 is associated with a propulsion unit 56 and propels water through the propulsion unit 56 generally in a direction designated by reference letter T to provide thrust.

With continued reference to FIG. 1, the propulsion unit or jet pump 56 includes a propulsion passage 58, or tunnel, having an intake tract 60 which extends through the lower portion of the hull 26. Desirably the impeller 54 is positioned within the propulsion passage 58, and is in direct fluid communication with a pump nozzle 62. Water from the body of water W in which the watercraft is operated is drawn in the direction I into the intake tract 60 by the impeller 54. The water is then expelled through the pump nozzle 62 to provide thrust T.

As is well known in the art, an intake grate or scoop grate (not shown) may cover the intake tract 60 of the propulsion passage 58. The intake grate is a grill-like component that mounts on the bottom of the hull 26 and feeds water to the jet pump 56 while also preventing foreign objects from entering the jet pump 56.

Additionally, a ride plate 64 is provided on the lower rear portion of the hull 26 of the watercraft body 24. The ride plate is desirably a flat piece of metal that covers a cut out for the jet pump 56 in the lower portion of the hull 26 of the watercraft body 24 which forms, in part, the tunnel 58, as is known in the art. In a sense, the watercraft 20 "rides" on this plate 64.

As will be recognized by those of skill in the art, a steering nozzle 63 may be affixed to the jet pump 56 in a manner which allows the steering nozzle 63 to pivot left and right to control the direction of thrust T created by the jet pump 56. The steering nozzle 63 may also be mounted for up and down movement, as will be recognized by those of skill in the art. In this manner, the watercraft 20 may be steered along a desired tack. In order to steer the watercraft 20, the steering nozzle 63 is preferably connected to a steering cable (not shown). The steering cable (not shown) extends between the steering mechanism 38 and the steering nozzle 63 and is connected therebetween in a known manner.

The engine 48 includes a cylinder block 70 having a cylinder head 72 connected thereto and cooperating therewith to define two cylinders 74 in the illustrated embodiment. A combustion chamber 76 is defined by a cylinder wall within the cylinder block 70, a recessed area in the cylinder head 72 and a top of a piston 78. The piston 78 is mounted for reciprocation within the cylinder 74 and is connected to the crankshaft 50 via a connecting rod 80, as is well known in the art. Preferably, the engine 48 is tilted or inclined so that the combustion chambers 76 have a centerline C that is offset in a first direction from a vertical axis. This arrangement keeps the vertical profile of the engine 48 small, which in turn allows the watercraft 20 to be designed with a low center of gravity.

With reference to FIGS. 3 and 4, the crankshaft 50 has pin portions 86 extending between web portions 88 with each connecting rod 80 connected to one of the pin portions in a known manner. The crankshaft 50 is constrained for rotational movement with respect to the cylinder block 70 by a number of seal bearings (not shown) within a crankcase chamber 82. A crankcase cover member 84 that extends from a bottom portion of the cylinder block defines, in part, the crankcase chamber 82.

With continued reference to FIGS. 3 and 4, the engine 48 also includes an air intake and fuel mixture system 89. Preferably, this system 89 is provided for delivering an air fuel mixture A/F (see FIG. 4) for combustion within the engine 48 and may communicate with each cylinder 74 individually. The system 89 draws air A (see FIG. 3) from within the engine compartment 42 (the air A enters the engine compartment through one or more air inlets in the hall 26) into a silencer 90. The air A is then delivered to a venturi passage 92 of a carburetor 94. As is well known by those of skill in the art, the carburetor 94 desirably has a butterfly valve 98 which may be opened or closed to increase or decrease the flow rate of air into the engine 48 for combustion.

Fuel is provided to the incoming air A within the carburetor 94. In particular, fuel is drawn from a fuel supply (such as a fuel tank designated by reference numeral 100 in FIG. 1) by a fuel pump (not shown) and delivered through a fuel delivery line (not shown) to the carburetor 94. A throttle body 96 is preferably positioned between the engine 48 and the carburetor 94 and has a throttle valve (not shown) for allowing the watercraft operator to control the rate of air and fuel (A/F) delivery to the engine 48 for controlling the speed and power output of the engine 48 via a throttle linkage (not shown) as discussed above. It is contemplated that the fuel may also be provided by indirect or direct injection, as well as via carburetion, as is well known by those of skill in the art.

With reference to FIG. 4, the air and fuel mixture A/F selectively passes through an intake port 102 into the crankcase chamber 82 as controlled by a reed valve 104, as is known by those of skill in the art. As is also well known, the intake port 102 and the corresponding reed valve 104 are preferably provided for each combustion chamber 76 individually. As discussed above, the crankcase chamber 82 is compartmentalized to provide the crankcase compression feature for each combustion chamber 76 as is well known in the operation of two-cycle engines.

With continued reference to FIG. 4, the air and fuel charge A/F within the crankcase chamber 82 is delivered to each cylinder 74 through several scavenge passages 106 in a Schnurle-type scavenging system, for instance. The scavenge passages 106 lead to a number of scavenge ports 108 in the cylinder wall. The air and fuel charge A/F is introduced into the combustion chamber 76 through this scavenge system, as is known.

With reference now to FIGS. 3 and 4, a suitable ignition system is also provided for igniting the air and fuel mixture A/F. Preferably, the system comprises a spark plug or other ignition element 110. The spark plug 110 is desirably arranged to extend through the cylinder head 72 as is well known to those of skill in the art. Desirably, the spark plug 110 corresponds to each combustion chamber 76 and extends into the combustion chamber 76. Additionally, an appropriate ignition system control is desirably used to control the timing of the firing of the spark plug 110 to ignite the air and fuel charge A/F.

A flywheel (not shown) is desirably connected to one end of the crankshaft 50. The flywheel (not shown) may have a number of magnets thereon for use in a pulsar-coil arrangement for generating firing signals for the ignition system. In addition, the ignition system may include a battery, discussed later, for use in providing power to an electric starter 111 and other electrical features associated with the watercraft and/or engine. In that case, a number of teeth (not shown) may be positioned on the periphery of the flywheel (not shown) for use in staring the engine 48 with the starter motor 111. As illustrated in FIG. 4, the starter motor 111 is desirably positioned near the bottom the hull 26 yet above a liquid-removing element such as a sump (not shown).

The engine 48 may also include a lubricating system that provides lubricating oil to the various moving parts of the engine. Such a system may include an oil tank or reservoir (not shown) from which lubricating oil is delivered and circulated, including for mixing with the fuel which is supplied to the engine, as is well known to those of skill in the art.

The engine 48 also includes a suitable cooling system. Preferably, the cooling system is a liquid cooling system which draws cooling water from the body of water W in which the watercraft 20 is being operated and circulates it through various cooling water jackets 112 in the cylinder block 70, cylinder head 72 and the like.

Exhaust gas generated by the engine 48 is routed from the engine 48 to a point external to the watercraft 20 by an exhaust system 114. With reference to FIG. 4, the exhaust system 114 includes an exhaust port 116 in the cylinder wall or extending through the cylinder head 72. An exhaust passage 118 extends from the exhaust port 116.

With reference to FIG. 1, the exhaust system 114 may also comprise an exhaust manifold 120 that combines the spent gases from each of the exhaust ports 116 of the cylinders 74. Desirably, the manifold 120 is connected to a side of the engine 48 and has a pair of branches with passages leading therethrough aligned with the passages leading through the cylinder wall or head 72 and merging into a single passage. As is known, the exhaust system can also comprise a plurality of individual pipes that exhaust the spent gases from the cylinders to a location external of the watercraft body.

The exhaust manifold 120 is in communication with a header pipe 122 that preferably curves around the front end of the engine 48. The header pipe 122 may be provided with a cooling water jacket (not shown) around the shell of the exhaust pipe. In this fashion, the header pipe 122 helps to keep the engine and exhaust temperatures down in a known fashion.

A flexible coupling 123 may connect the header pipe 122 to a diffuser cone 124. The diffuser cone 124 shapes a sonic wave as the exhaust is exiting the diffuser cone 124. In addition, it shapes a return exhaust port-plugging wave to help keep the fresh fuel and air mixture from escaping the combustion chamber 76 of the cylinder 74.

Preferably, the diffuser cone 124 is, in turn, connected to the main expansion chamber body 126. The main expansion chamber body 126 is an enlarged exhaust passage and forms one of the key tuning variables of a performance exhaust system 114. As is known by those of skill in the art, changing the length or diameter of the expansion chamber 126 will change the RPM where the most horsepower is produced. A catalyst (not shown) may be positioned within the expansion chamber 126.

In the illustrated exhaust system, the main expansion chamber body 126 is in turn connected to a converging cone 128. The converging cone 128 ensures that the exhaust and the sonic wave produced by the exhaust bounces off the converging cone 128 and returns to help plug the exhaust port 116.

The illustrated converging cone 128 is in turn connected to a stinger 130. The stinger 130 is the location where the exhaust exits the tuned part of the exhaust system 114 before the exhaust enters a water box 132. Water may be injected into the exhaust at the stinger 130 to help baffle and cool the exhaust flow. The diameter of the stinger 130 and the amount of water injected into the stinger 130 change the amount of exhaust backpressure. A smaller stinger 130 or a lot of injected water will typically increase top speed while sacrificing the lower end torque.

The illustrated stinger 130 is preferably connected to the water box 132, as referenced above, through a flexible coupling (not shown), such as a rubber sleeve. The water box 132 desirably forms a final portion of the watercraft exhaust system 114 that mixes water and sound waves to muffle the exhaust noise. In addition, the water box 132 is provided with a plurality of baffles (not shown) to help retard backflow of water in a known manner in case of an engine stall.

The outlet of the water box 132 is preferably connected to an exhaust pipe 134. The exhaust pipe 134 is desirably arranged to discharge the exhaust into the body of water W in which the watercraft is operating. The outlet of the exhaust pipe 134 may be arranged within the propulsion passage 58 or jet pump unit 56.

The watercraft thus far described is considered to be well known. Accordingly, any omitted details are believed to be known to those of skill in the art and further description of these details is deemed unnecessary.

With reference now to FIG. 4, a mechanism is provided for controlling the timing of the flow of exhaust gases through each exhaust passage 118 from each cylinder 74. Preferably, this means comprises an exhaust timing control device 136. The exhaust timing control device 136 generally comprises a sliding knife-type exhaust control valve 138 and a mechanism for moving the valve 140.

The exhaust control valve 138 is translatable within an exhaust control valve guide passage 142. The guide passage 142 preferably extends through the cylinder block 70 from a top side adjacent the cylinder head 72 into the exhaust passage 118 proximate the exhaust port 116. Desirably, the exhaust control valve guide passage 142 is sized to accommodate the exhaust control valve 138 in all conditions, such as, for example, but without limitation, differing materials having differing thermal expansion constants and the like. The sizing thereby preferably accommodates any thermal expansion and allows the exhaust control valve 138 to freely slide within the exhaust control valve guide passage 142 while also providing a scraping surface to remove any kind of deposits on the exhaust control valve 138 as will be discussed below.

As illustrated in FIG. 4, the exhaust control valve 138 has a generally flat or plate-like body having a first end positioned in the exhaust passage 118 proximate the exhaust port 116. At the location of the exhaust port 116, an exhaust opening 144 is defined. Preferably, the end of the exhaust control valve 138 is shaped such that the valve blends with the exhaust opening 144 when the valve 138 is in its fully retracted position.

The exhaust control valve 138 has a pin 146 arranged on the end opposite of the exhaust port 116. The pin 146 is coupled with a yoke arrangement 148 that is affixed to a rotatable actuator shaft 150. As will be recognized by those of skill in the art, this arrangement allows the rotational motion of the actuating shaft 150 to be converted into a translating motion for the exhaust control valve 138 due to a U-shaped slot defined within the yoke 148. The pin 146 slides within this slot.

The exhaust control valve 138 is arranged to move between a first retracted or opened position in which the exhaust control valve 138 generally does not obscure the passage 118 and a second extended or closed position in which the valve obscures a portion of the passage 118. In short, movement of the exhaust control valve between a closed position and an open position reduces or enlarges the effective cross sectional area of the exhaust port 116 and opening 144 respectively.

When in the retracted position, the valve 138 may be the to be in an "advancing" position since the timing of the flow of exhaust from the cylinder 74 occurs as soon as the piston 78 moves downwardly (from the top dead center) in the cylinder 74. In this position, the timing of the closing of the port 116 as the piston 78 moves up (from bottom dead center) is also delayed. Thus, in this position, the exhaust flow starts earlier and lasts longer. On the other hand, when in the extended position, the valve 138 may be the to be in a retarding position since the flow of exhaust from the cylinder 74 is delayed because the piston 78 must move farther down the cylinder 74 before the port 116 is opened. In the same position, the timing of the closing of the port 116 as the piston 78 moves upward is advanced. Of course, the valve 138 may be moved to a variety of positions between the first and second positions. In other words, the valve may assume any intermediate position between the fully opened and fully closed positions. It is understood that the valve may or may not fully obscure the exhaust port even in its "fully closed" position and may or may not fully open the exhaust port even in its "fully open" position.

The mechanism for moving the valve 140 preferably comprises a drive unit including a motor 152 which is arranged to drive the shaft 150 and the attached yoke 148. In turn, the yoke 148 moves the pin 146. The pin 146 translates the illustrated exhaust control timing valve 138 within the exhaust control valve guide passage 142.

With reference again to FIG. 4, the motor 152 is preferably mounted remotely from the valve 138. Accordingly, a linkage 154 interconnects the motor 152 and the yoke and shaft combination 148, 150. In the illustrated embodiment, the linkage preferably comprises a drive pulley 156, which is driven by the motor 152, and a driven pulley 158, which is rotatably mounted to the engine 48 near the valve 138 by the pin 146. A drive element 160 extends between the pulleys 156, 158 such that the drive pulley 156 can drive the driven pulley 158 in a manner well known to those of skill in the art. The drive element 160 can comprise any suitable element such as, for instance but without limitation, a belt, a looping cable, a continuous loop of material and the like.

It should be apparent to one of skill in the art that the motor 152 may be powered in a single direction or may be a reversible type of motor. The motor 152 is preferably an electric motor, such as, for example, but without limitation a servo or stepper motor. In the event that the motor 152 is a unidirectional motor, the valve 138 is preferably arranged to be biased, such as with a spring, into a first position. In this fashion, the motor 152 is arranged to counteract the spring and move the valve 138 into a variety of positions between its first position and its second position.

Although the drive mechanism 140 is illustrated in connection with only one of two valves 138 of the engine 48, the other valve 138 is of course similarly driven. As will be appreciated by those of skill in the art the same motor 152 may be arranged to drive the other valve or an entirely separate motor 152 and linkage 154 may be utilized.

Furthermore, with reference to FIG. 4, the shaft 150, the yoke 148 and the pin 146, together with the exhaust control valve 138, are preferably located within a recess defined to the side of the cylinder 74 and the attached cylinder head 72. A cover element 162 may be provided to protect the components housed therein from damage.

In accordance with an aspect of the present invention, a motor control system 136 may be provided for controlling the movement of the exhaust control valve 138 via the motor 152 or other valve driving mechanism. The motor control system 136 preferably controls the movement of the valves 138 in relation to the engine speed, load and other characteristics of the engine, as described below. The motor control system 136 may also be a part of a larger engine control arranged to also control other aspects of the engine such as the ignition element 110, the timing of the firing of the spark plug 110, the timing and duration of fuel injection (if applicable) and the like.

With continued reference to FIG. 4, an electrical system and the motor control system 136 will now be described in detail. Preferably, the electrical system includes a power source 172, such as a battery or generator, for powering a main or master control unit 174 and for selectively powering a drive control 170. In the illustrated embodiment, the main control unit 174 is arranged with no main switch between it and the power source 172, such that power is always provided to the control unit 174. The drive control 170 is desirably arranged to turn on and off the motor 152 which drives the drive pulley 156, or otherwise control it movement as controlled or instructed by the main control unit 174.

In the illustrated embodiment, the drive control 170 is in electrical communication with the motor 152 in a known manner. The motor 152, therefore, is controlled by the drive control 170 such that the motor either starts or stops or changes direction or speed as a result of a signal provided by the drive control 170. The drive control 170 can either provide its own signal or simply respond to an output signal of the main control unit 174.

A lanyard switch 178 is preferably provided for controlling the power flow to the ignition circuit of the watercraft 20. The lanyard switch 178 may be of the type that includes a mechanism by which the switch 178 is shut off in an emergency, such as when the operator falls from the watercraft 20. For instance, the switch 178 may be connected to a wrist leash worn by the operator. In the event the operator falls from the craft, or the like, the switch 178 is triggered, or opened, and cuts power to the ignition system, thereby stopping the engine 48.

A starter switch 176 is also desirably provided for turning on and off the power to one or more engine systems, including the starter motor 111. This switch 176 may be conveniently positioned on or near the steering handle. A selector switch 184, described in more detail below, is also preferably provided and is preferably positioned near the starter switch 176. Through use of the selector switch 184, an operator may exercise some degree of control over the conditions required prior to initiation of an exhaust control valve cleaning cycle.

The control unit 174 is preferably designed to sample from a variety of input mechanisms such that various operating parameters of the engine 48 may be determined. For instance, the illustrated control unit is adapted to sample whether the start switch 176 is in an on or off position. Additionally, the illustrated control unit 174 can determine whether the lanyard switch 178 has been activated or not. As is well known to those of skill in the art, the lanyard switch 178 effectively grounds the spark plug 110 such that the air fuel mixture within the combustion chamber cannot be ignited and the engine ceases to run.

The illustrated main control unit 174 can also sample the engine speed through any suitable engine speed detection sensor 180 as well as the angle of the throttle through any suitable throttle angle detection sensor 182. Moreover, the illustrated control unit 174 senses the position of the operator-controlled selector switch 184.

The present exhaust control valve control system, in part, concerns the sequence under which the exhaust control valve 138 is operated and cleaned. The cleaning operation referred to above generally comprises a single or repetitive selective movement of the exhaust control valve 138 between a first position and a second position.

The illustrated control for accomplishing valve movement is generally responsive to the output of certain sensors, which are input into the control unit 174, as referred to above. Specifically, the movement may depend, in part, upon the input of the throttle position sensor 182, the engine speed sensor 180, and the selector switch 184 that outputs signals to the control unit 174. The control unit 174 determines the engine operating mode or condition from the input signals of the sensors 180, 182 and 184. The main control unit 174 then outputs the control signals to the drive control 170 which controls the operation of the motor 152 that is used to alter the positioning of the exhaust control valves 138.

The exhaust control valves 138 are preferably positioned in their fully opened position during starting to change the exhaust port timing. This exhaust port timing is equivalent to that of a full load and speed of the engine 48 and thus provides an earlier exhaust port opening and a later exhaust port closing. In addition to reducing the effective compression ratio, this positioning also provides a longer scavenging period and easier starting.

Having described the structural connections of the present invention, the various aspects of the exhaust control valve control strategies will now be described with reference to FIGS. 6–13. In general, the strategies preferably cycle the exhaust control valves 138 during a running period prior to the attainment of a planing engine speed. In the illustrated embodiment, it has been determined that the engine speed required for the personal watercraft, which form the illustrated environment, to attain a planing state is approximately 4500 RPM. Thus, upon an engine speed of approximately 4500 RPM the watercraft can rise on plane and maintain the planing position. Moreover, the strategies generally cease the exhaust control valve cleaning cycles during periods of rapid acceleration. Having introduced these general statements regarding an aspect of exhaust control valve control strategies, various other detailed aspects of control strategies will now be explored.

Figure 6:
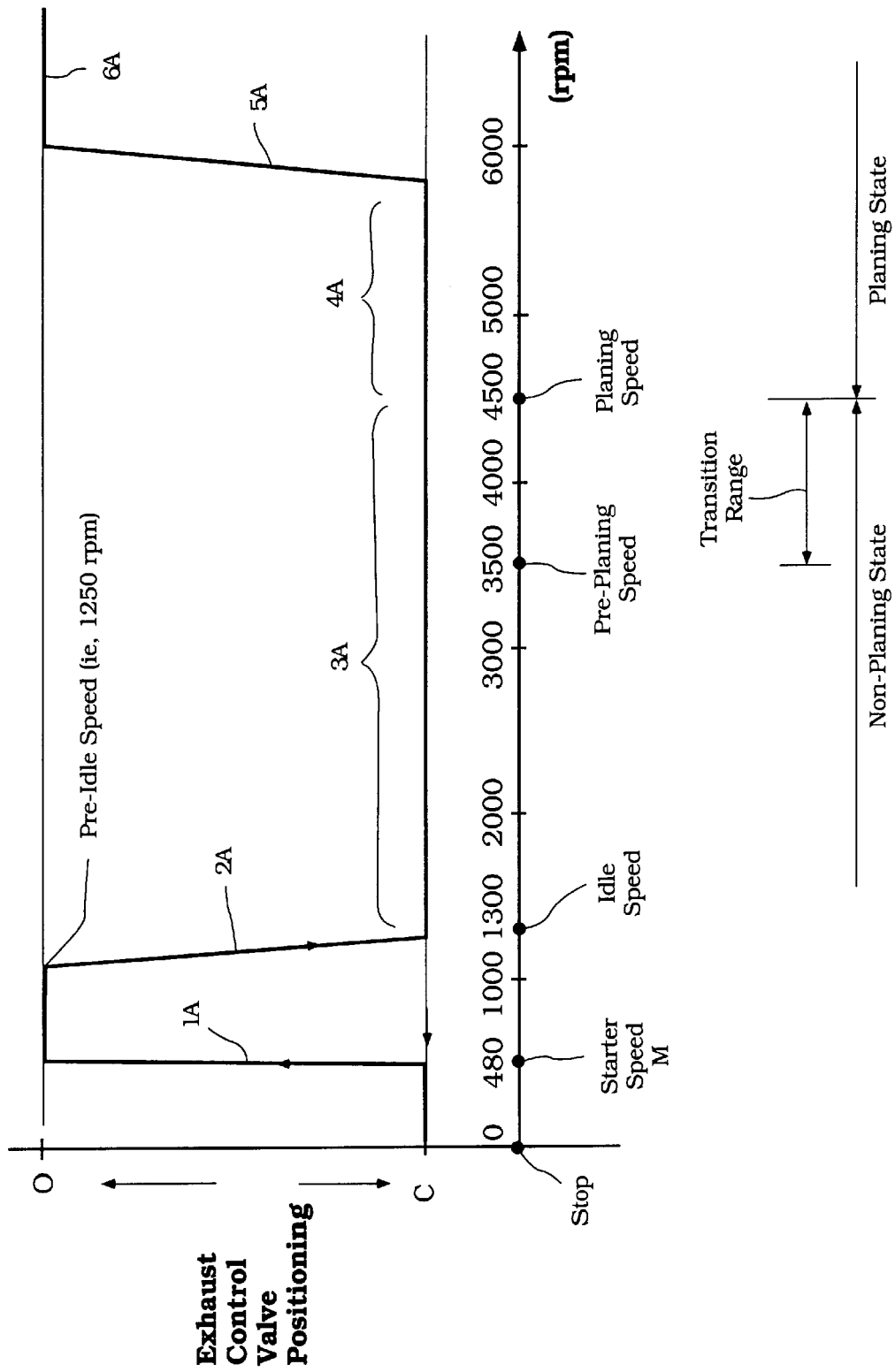
FIG. 6 is a graphical representation of Exhaust Control Valve Position vs. Engine Speed of a first aspect of an exhaust control valve control strategy.
Figure 7:
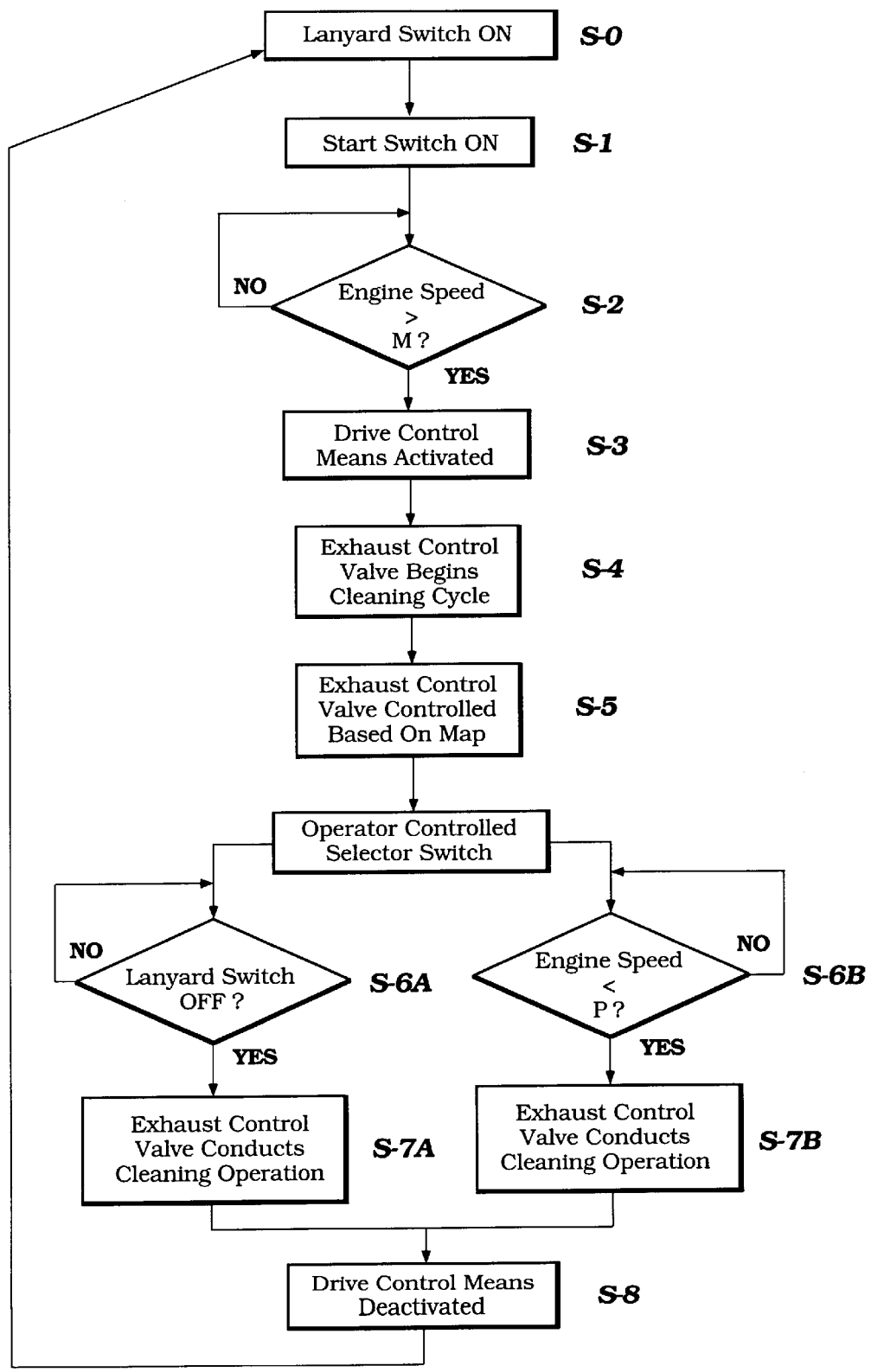
FIG. 7 is a flow diagram illustrating the first aspect of the strategy, which strategy results in the graphical presentation of FIG. 6.

With reference to FIGS. 6 and 7, the exhaust control valve 138 may conduct a cleaning operation at speeds that will not inhibit smooth acceleration of the engine 48 from an idle speed to a planing speed. With reference now to FIG. 6, it is shown that the exhaust control valve 138 is initially positioned in a closed position such that the cross-sectional area of the exhaust port 116 is at a minimum. The exhaust control valve 138 is maintained in this closed position while the engine starter motor 111 is engaged with the flywheel (not shown). In this position, the exhaust control valve 138 helps to provide a maximum compression ratio to assist in starting and to decrease the amount of air and fuel charge A/F which escapes the combustion chamber 76 through the exhaust port 115 during starting.

With reference to FIG. 7, the exhaust control valve 138 is controlled according to a routine illustrated in FIG. 7 in this first aspect of the present invention. In order to determine when the engine 48 is going to be started, the routine first seeks to determine whether the lanyard switch 178 is turned on such that ignition can occur (S-0) and whether the start switch 176 has been switched to an on position (S-1) such that the starter 111 can engage with a starter ring (not shown) attached to the flywheel (not shown).

When the lanyard switch 178 is on, power flows to the control unit 174 and the ignition system. The start switch provides power to the starter 111 to initiate ignition in a known manner. The engine then begins to operate. Once the engine speed exceeds the first predetermined engine speed M, the control unit 174 turns the drive control 170 on. As stated above, the first predetermined speed M is preferably a speed less than the idle speed of the engine. The predetermined speed M is desirably at minimum speed at which the engine 48 is powered under its own power without the engagement of the starter motor 111. Moreover, the predetermined speed may be a speed which is preset and stored in the memory module accessed by the control unit or otherwise stored for use in conjunction with the exhaust control system. For example, if the idle speed of the engine is approximately 1,250 rpm, as in the illustrated embodiment, then the desired first predetermined engine speed should be below 1,250 rpm. Preferably, the checked engine speed is at an engine speed such as about 480 rpm. Until the engine speed reaches this value, the routine continuously samples the engine speed through an engine speed detection sensor 180 (S-2). Once the engine attains the predetermined engine speed M, the control unit 174 turns the drive control 170 on.

After the drive control 170 is turned on, an exhaust valve cleaning operation is commenced, preferably at an engine speed less than the speed of the engine which corresponds to a watercraft planing speed. This is clearly depicted in FIG. 6 as lines 1A and 2A. If the engine speed quickly exceeds that speed corresponding to the watercraft planing speed, the cleaning operation may be aborted. Otherwise, the drive control 170 turns on the motor 152 moving the exhaust control valves 138 between their closed and open positions.

Preferably, the valves 138 are caused to move some degree between the opened and closed position to scrape off harmful carbon, salt and other deposits. In this regard, it is noted that the valves 138 need not be moved completely from their opened to closed positions, but simply partially over that range to remove the deposits. Preferably, the movement of the valves 138 is not to such a degree as might seriously hinder operation, such as causing the stalling of the engine. Moreover, it should be noted that the valves may move together or separately. Additionally, the range of movement for each valve may differ from, or be the same as, the range of movement for the other valve or valves.

As illustrated in FIG. 6 by the arrows of 1A, 2A and the arrow connecting 1A and 2A at the bottom, the exhaust control valve 138 continues to be cycled until the engine reaches an idle speed. In one embodiment, the idle speed is approximately 1,250 rpm. Other idle speeds, of course, are also contemplated according to the application. Eventually, the exhaust control valve 138 returns to a closed position upon reaching an idle speed. This comprises the step S4 of FIG. 7.

In a step S5 of FIG. 7, the control unit 174 controls the exhaust valves 138 through the drive control 170 in accordance with a mapped (i.e., such as from a memory unit) exhaust valve control strategy. This strategy may control the valves 138 based on engine speed and the like. For example, the valves 138 are generally moved towards or to their closed position when the engine speed is low so as to retard the exhaust timing and increase the effective compression ratio while the valves are moved toward or to their open position as engine speed becomes high to advance the exhaust timing and decrease the effective compression ratio.

At this stage of the control routine, the control unit 174 determines whether an operator-controlled selector switch 184 is in any of a number of positions. While the operator controlled selector switch 184 may be a manual switching, it can also be a computer controlled switching, which is variably selected or selected based upon engine parameters. Through the selector switch 184, the operator may select whether the exhaust control valve 138 conducts a cleaning operation based upon the lanyard switch 178 positioning or the engine speed, or both.

In the event that the operator-controlled selector switch 184 indicates that the cleaning operation should be controlled by the lanyard switch 178, once the lanyard switch 178 kills the engine, an exhaust control valve cleaning operation is conducted. This reflects the branch comprising steps S-6A and S-7A of FIG. 7. During this cleaning operation, a predetermined number of cycles of the valve 38 between an open and a closed position are performed. As reflected in FIG. 7 at step S-8, upon the completion of this cleaning operation, the drive means is deactivated and the routine begins again at S-1.

The operator control selector switch 184 may also indicate that the exhaust control valve cleaning operation may be activated as a function of engine speed. In this manner, the exhaust control valve cleaning operation does not occur while the watercraft is accelerated to a planing state. However, as reflected in step S-6B in FIG. 7, the exhaust control valve 138 conducts a cleaning operation upon the engine speed failing below a planing speed as determined by a pre-programmed value in the control unit 174. The pre-programmed value of engine speed may be a speed less than idle, which would indicate that the engine 48 is being shut off. It is also understood that the preprogrammed value of engine speed may also be of any value greater than the idle speed, which would allow a cleaning operation to occur at an engine speed lower than, for instance, the pre-planing speed of approximately 3,500 rpm.

Upon reaching this engine speed, the control unit 174 initiates a cleaning operation similar to that performed with reference to the lanyard switch routine above. In other words, the exhaust control valve 138 is cycled between an open and closed position for a predetermined number of cycles such that deposits may be scraped from the exhaust control valve 138. At the completion of this exhaust control valve cleaning operation, the drive control 174 is deactivated in step S-8 and the cycle begins again at S-1.

Figure 8:
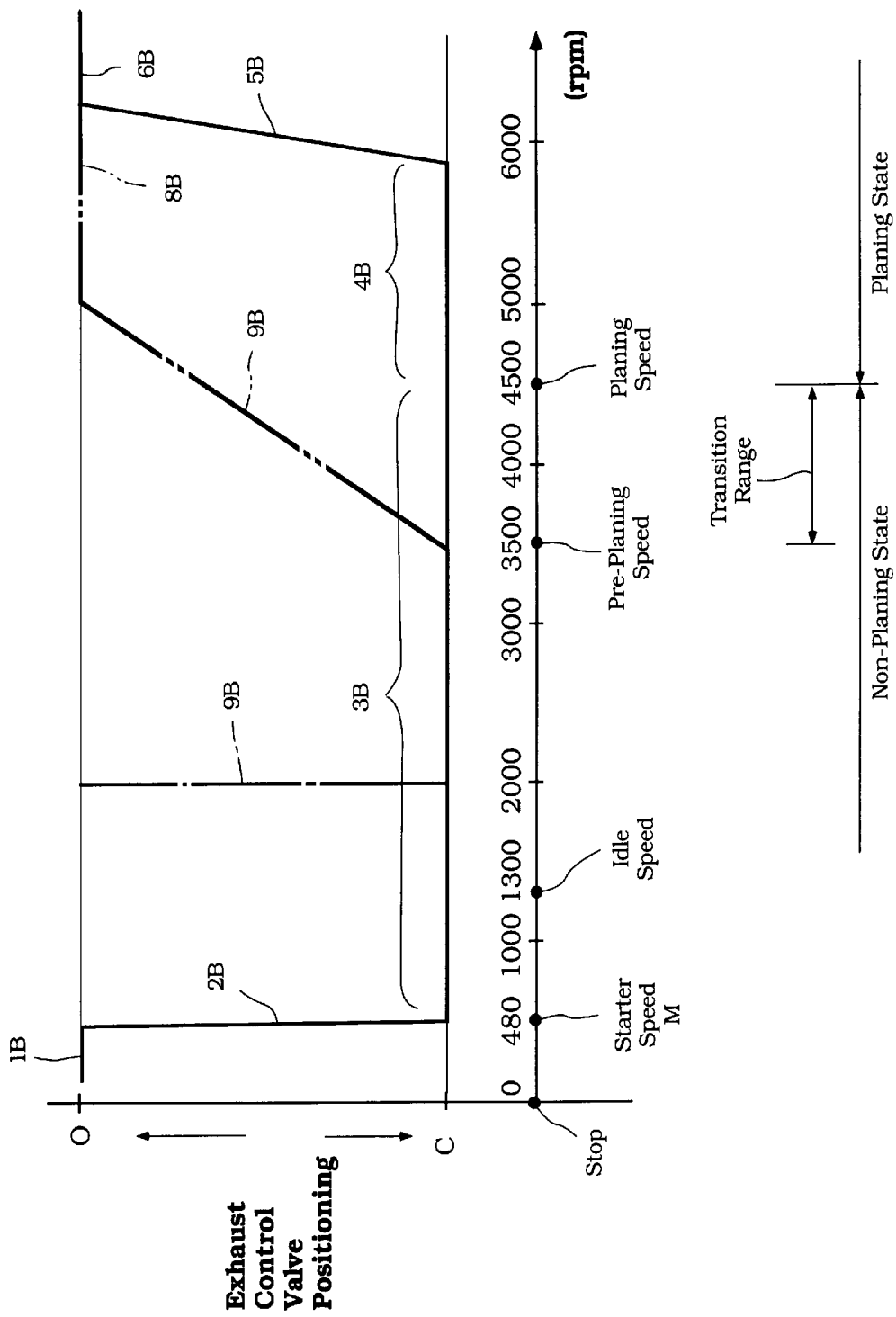
FIG. 8 is a graphical representation of Exhaust Control Valve Position vs. Engine Speed of another aspect of an exhaust control valve control strategy.

With reference to now to FIG. 8, another aspect of an exhaust control system is illustrated in graphical form. As illustrated, the exhaust control valve 138 is preferably positioned in an open position upon the starting of the engine 48. The exhaust control valve 138 can be maintained in this open position until the engine 48 achieves a speed upon which the engine 48 can then operate without the engagement of the starter motor 111. This portion of the exhaust control system is illustrated as line 1-B in FIG. 8. Line 2-B in FIG. 8 illustrates a rapid closing of the exhaust control valve 138 upon starting of the engine 48. This position of the exhaust control valve is desirably maintained through at least the idle speed. In the illustrated embodiment, the speed at which the transition between open to closed occurs is at approximately 480 rpm, while the idle speed is approximately 1300 rpm.

In the illustrated embodiment, upon reaching the pre-planing speed, two distinct paths are identified. The first path identified (illustrated by the solid line) corresponds to maintaining the exhaust control valve 138 in a closed position until approximately 6000 rpm. At this speed, the boat is up on plane. This path is preferably followed under normal accelerating conditions, meaning that the throttle valve position is being slowly increased as opposed to being opened in one quick movement. In the illustrated embodiment, upon reaching 6000 rpm, or approximately 6000 rpm, the exhaust control valve 138 may then be opened relative to a map of desired positions, as described above. This movement is illustrated by line 5-B and preferably culminates in the complete opening of the exhaust control valve 138 that can then be maintained in an open position for any further acceleration of the engine speed.

The second illustrated path originates at the pre-planing speed, identified above as approximately 3500 rpm, and relates to a rapid acceleration mode. In a mode of rapid acceleration, the throttle valve 116 is generally rapidly opened to a wide-open position. Because the position of the exhaust control valve 138 is preferably altered using a mechanical motor of the types suggested above, the position of the exhaust control valve 138 may only be manipulated as quickly as the motor is capable of movement.

Accordingly, in order to accommodate rapid acceleration of the engine speed, the movement of the exhaust control valve 138 should be anticipated. For instance, in the illustrated embodiment of FIG. 8A, the opening of the exhaust control valve 138 begins at approximately the pre-planing speed identified as approximately 3500 rpm and continues through approximately 5000 rpm. In this manner, the exhaust control valve 138 reaches its fully opened state prior to that reached under a normal acceleration pattern. This is represented by lines 7B and 8B of FIG. 8. Upon reaching a filly opened state, the exhaust control valve 138 is then maintained in a fully opened state so long as the rapid acceleration is continued. If, however, the rapid acceleration is discontinued, the exhaust control valve may either be manipulated to follow the normal acceleration pattern identified earlier as lines 4B, 5B and 6B or maintained in the rapid acceleration profile.

Figure 9:
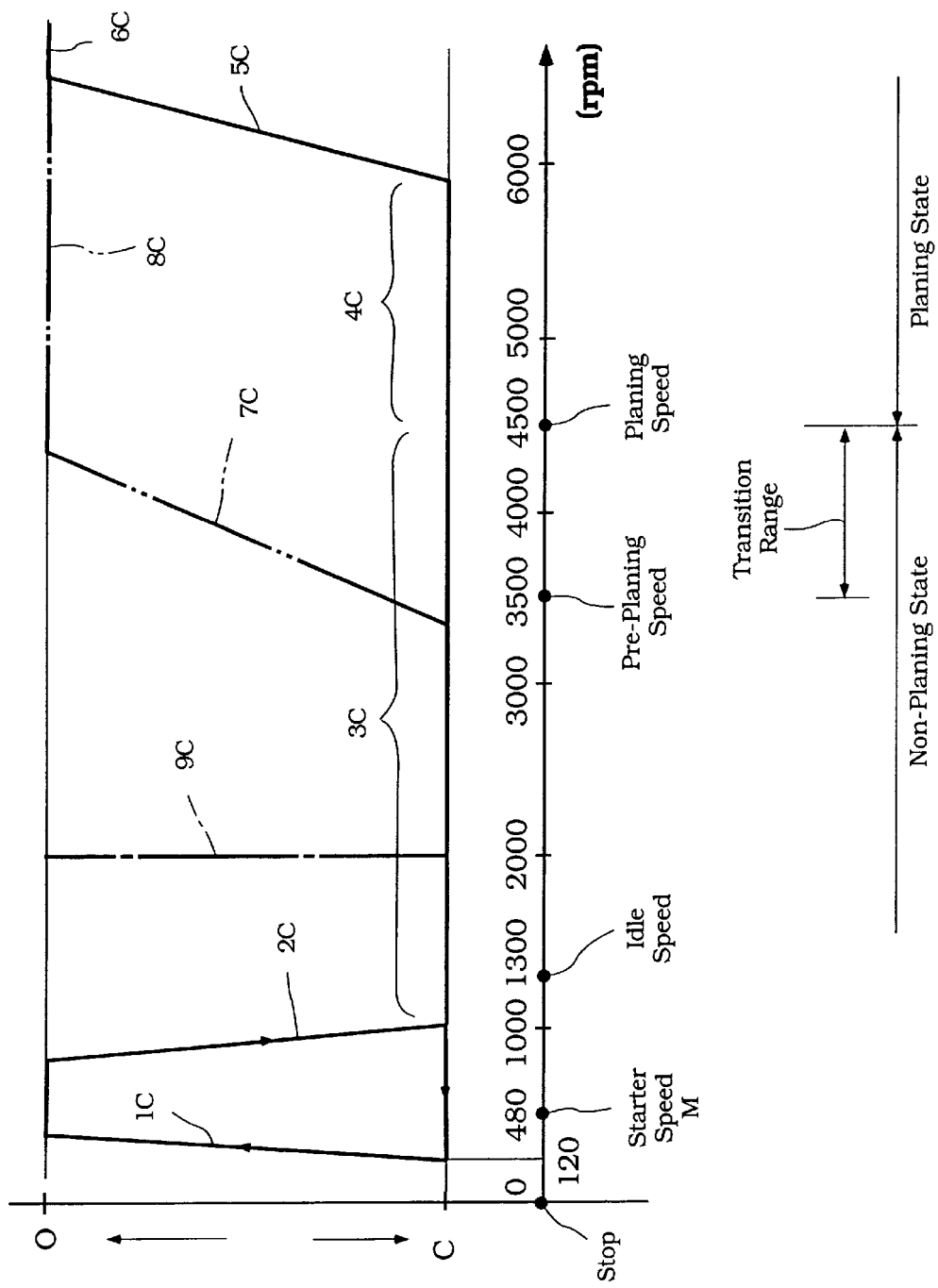
FIG. 9 is a graphical representation of Exhaust Control Valve Position vs. Engine Speed of yet another aspect of an exhaust control valve control strategy.

FIG. 9 also illustrates another aspect of the present invention. According to this aspect, the exhaust control valve 138 begins in a closed position and is maintained in a closed position upon starting until a predetermined speed is attained. In the illustrated embodiment, the predetermined speed is approximately 120 rpm.

At the predetermined speed, the exhaust control valve 138 is opened. Preferably, this opening of the exhaust control valve 138 is maintained until about 480 rpm. The exhaust control valve can then be moved to a closed position prior to reaching an idle speed. As illustrated in FIG. 9, should the engine speed not reach idle speed, the exhaust control valve 138 will continue to cycle between an opened and closed position.

As illustrated in FIG. 9, two paths of exhaust control valve positioning relative to engine speed are again identified. The solid line corresponds to a normal acceleration pattern while the phantom line corresponds to a rapid acceleration pattern. As illustrated in the aspect of the strategy illustrated by FIG. 9, under rapid acceleration, the exhaust control valve 138 is opened prior to the engine achieving the pre-planing speed. The exhaust control valve 138 thereby attains a fully opened state prior to the engine attaining a planing speed of approximately 4500 rpm.

Similar to FIG. 8, under normal acceleration, the exhaust control valve 138 will move from a closed to an open position at approximately 6000 rpm and will be moved according to a map identified by the control unit 174. It is anticipated that the maps may vary based upon the speed at which any rapid acceleration begins. For instance, if a rapid acceleration begins at approximately 4000 rpm, it is anticipated that a similar control map to that represented by lines 7C, 8C may be followed.

Figure 10:
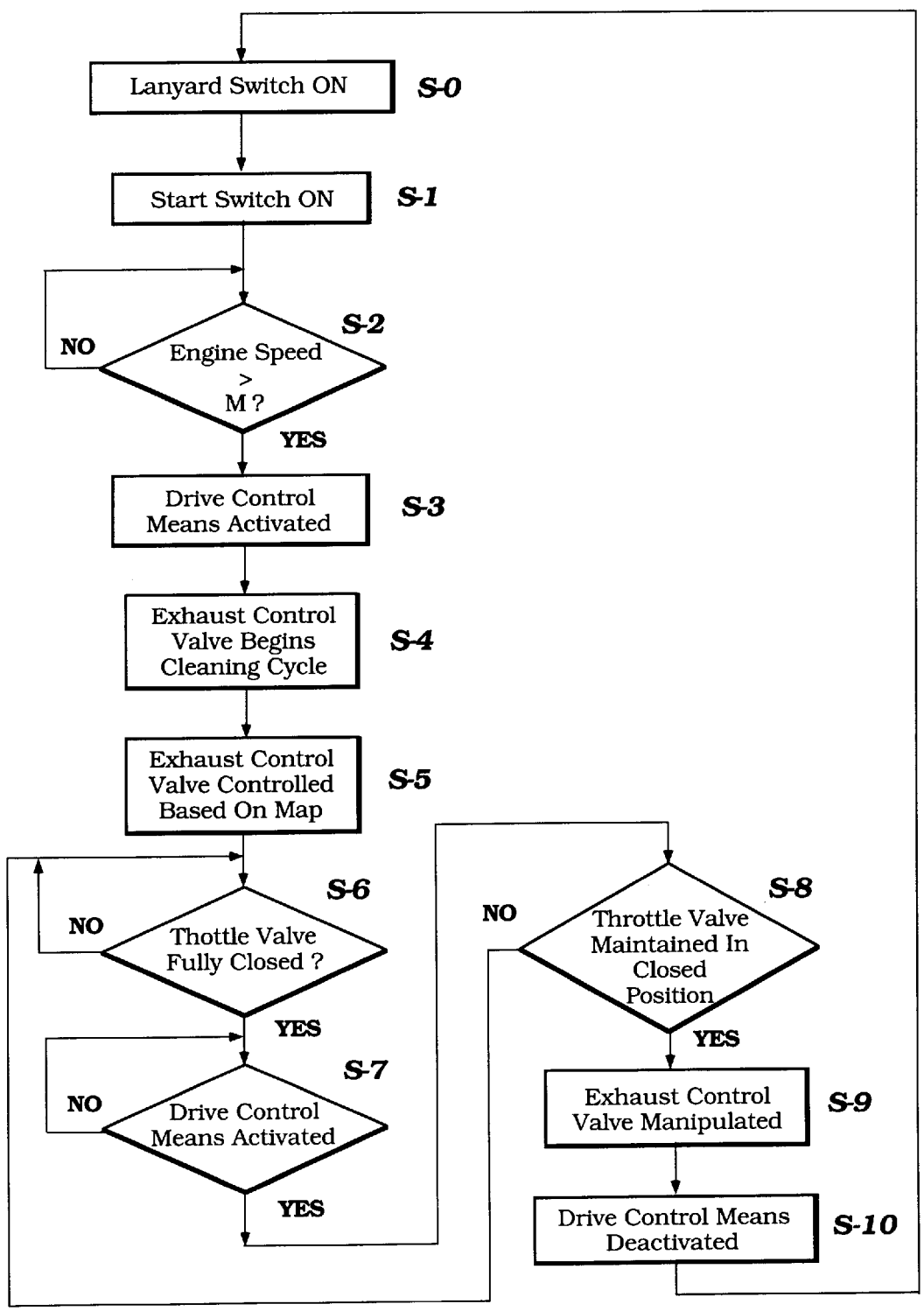
FIG. 10 is a flow diagram illustrating yet another aspect of an exhaust control valve control strategy.

With reference now to FIG. 10, yet another aspect of the present exhaust control valve control system is detailed in a flowchart. As illustrated, a control cycle begins when the lanyard switch 178 and the start switch 176 are turned on (S-0, S-1). In step S-2, the control unit inquires whether the engine speed is greater than a minimum speed M. Again, as with the other embodiments, this minimum speed is identified at the speed at which the engine 48 takes over under its own power without the assistance of a starter motor 111. However, other speeds may also be identified.

Upon reaching the minimum speed, the drive control 170 is actuated in step S3. In a step S4, the control unit 174 begins an exhaust valve cleaning cycle similar to that described with reference to FIGS. 8 and 9. This exhaust control valve cleaning cycle continues until a map controls an exhaust control valve positioning as in step S5.

Similar to the strategy embodied in FIGS. 8 and 9, the present strategy may continue the cleaning operation until a pre-planing speed, or other identified speed, is reached. Upon the engine speed exceeding this speed, an engine map may take over and control the positioning of the exhaust control valve 138, as described above. In a step S6, the position of the throttle valve is checked by the control unit 174. If the throttle valve is identified as being fully closed, which position generally corresponds to deceleration or idling, then the control unit 174 inquires whether the drive control 170 is activated in a step S7. The drive control 170 is designed to move the exhaust control valve 138 from an open to closed position, or a closed to open position, as described above. In the event that the drive control 170 is not activated, then the control unit 174 continues to inquire until the drive control 170 is activated.

Upon activation of the drive control 170, the control unit 174 then inquires, in a step S-8, whether the throttle valve has been maintained in a closed position. If the throttle valve positioning bas changed, then the routine reverts back to step S6 in which it inquires when the throttle valve has been closed. If, on the other hand, the throttle valve has been maintained in a closed position, then in a step S9, the exhaust control valve 138 is manipulated. In other words, upon a closing of the throttle valve or a deceleration followed by a drive control 170 activation, the exhaust control valve 138 is then closed. In a step S10, following the closing of the exhaust control valve 138, the drive control 170 is deactivated.

Figure 11:
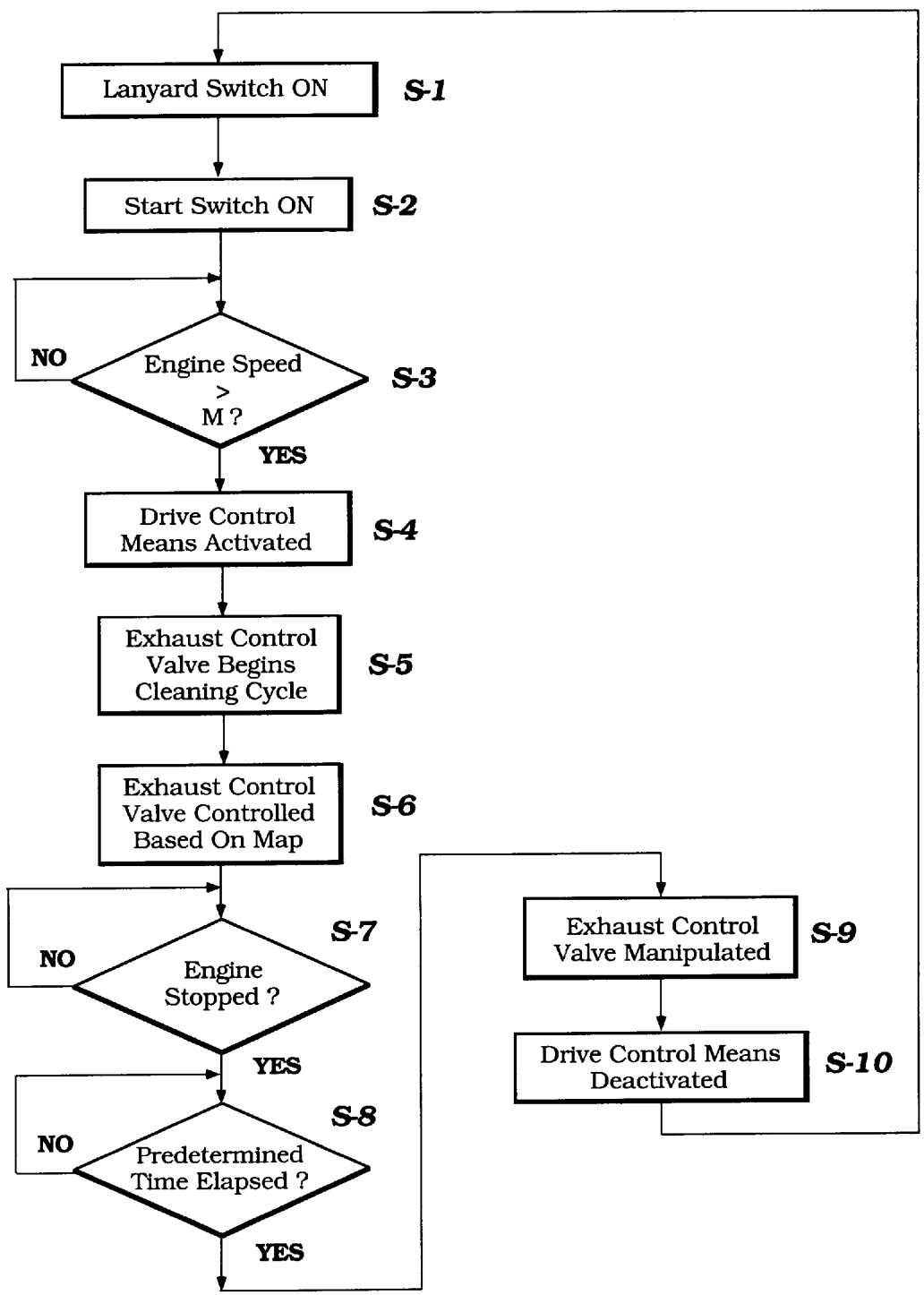
FIG. 11 is a flow diagram illustrating a further aspect of a strategy for an exhaust control valve control.

With reference now to FIG. 11, a similar strategy to that of FIG. 10 is illustrated. Again, in this embodiment, the control unit 174 inquires whether the lanyard switch 178 and the start switch 176 are in on positions. When the lanyard switch 178 is in the on position and the start switch 176 is in the on position, the control unit 174 inquires whether the engine speed has exceeded a minimum speed such as that identified above (S-3). Upon exceeding this minimum speed, the drive control 170 is activated such that the positioning of the exhaust control valve 138 may be altered. At this time, the exhaust control valve 138 is run through a cleaning cycle by the control unit 174, as described above, until the exhaust control valve positioning is controlled by the control unit 174 based upon a desired mapping (S-5, S-6).

In a step S7, the control unit 174 inquires whether the engine 48 has been stopped, such as by the disconnection of the lanyard switch 178 which kills the engine 48 (S-7). Upon the stoppage of the engine, a timer is set into motion (S-8). After a desired time interval elapses in a step S8, the exhaust control valve 138 is manipulated in a step S9. The exhaust control valve 138 either can be cycled through a cleaning cycle as described above, or can just be moved to a closed position from the open position. Following the manipulation of the exhaust control valve 138, the drive control 170 is deactivated and the routine begins again.

Figure 12A:
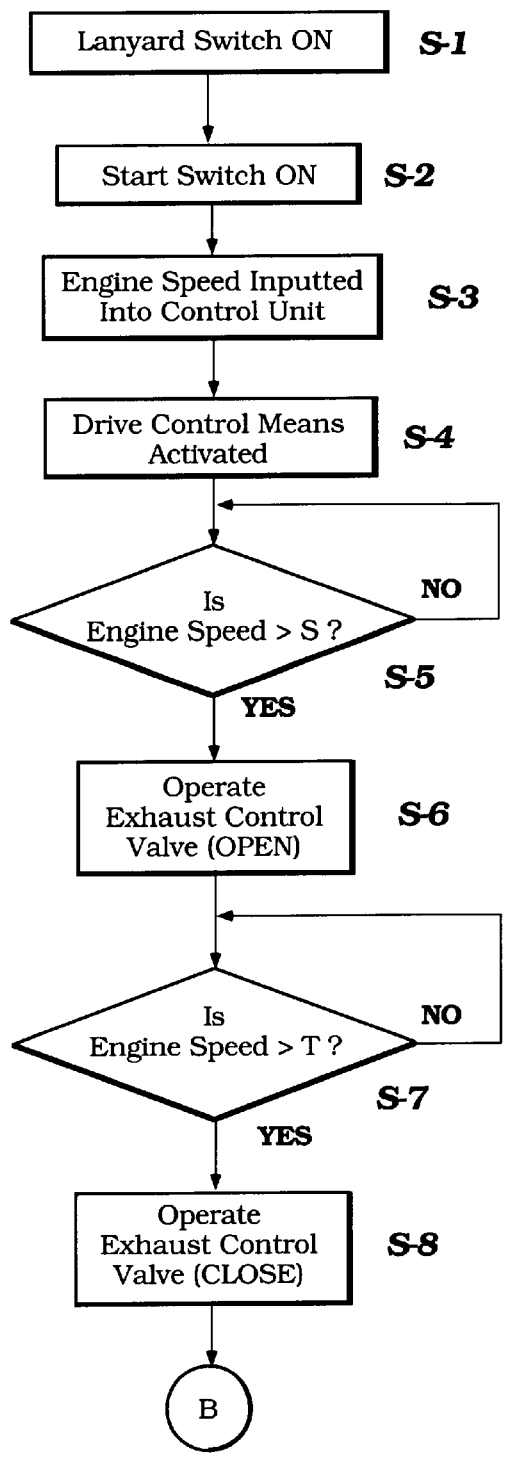
FIG. 12A is a flow diagram illustrating a first portion of another aspect of an exhaust control valve control strategy.
Figure 12B:
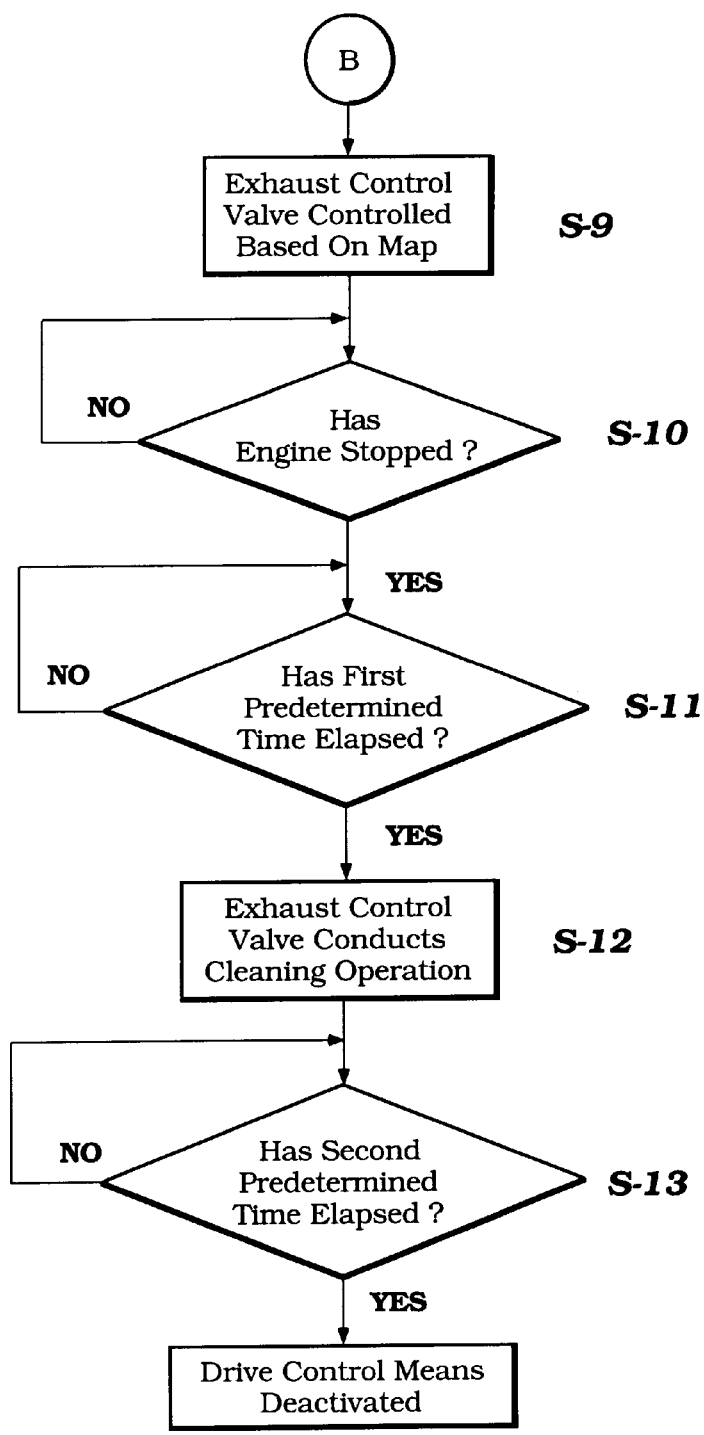
FIG. 12B is a flow diagram illustrating a second portion of the aspect of the strategy of FIG. 12A.
Figure 13:
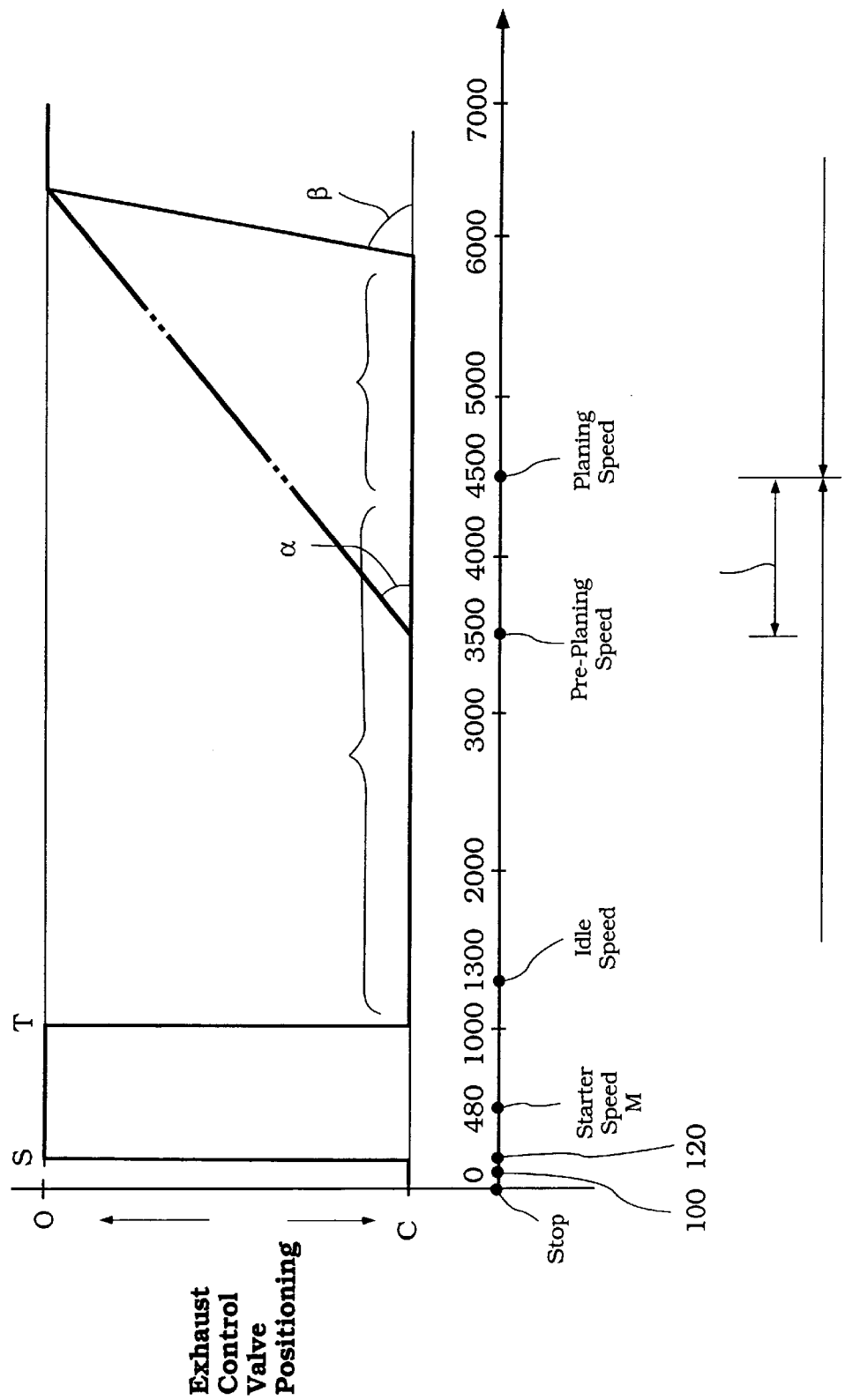
FIG. 13 is a graphical representation of Exhaust Control Valve Position vs. Engine Speed of the aspect of FIGS. 12A and 12B.

With reference now to FIGS. 12–13, a further strategy of the present invention is illustrated therein. In this strategy, the control system begins with the activation of the lanyard switch 178 and the start switch 176 in steps S1 and S2. In step S3, the engine speed is then acquired by the control unit 174 from the engine speed detection sensor 180. Upon receiving the engine speed, a drive control 170 is activated in a step S4.

The drive control 170 is maintained in an activated state while the engine speed is less than a predetermined speed S. In the illustrated strategy, the predetermined speed S is approximately 120 rpm. Upon attaining this predetermined speed S, the exhaust control valve 138 is urged into an open position. It is maintained in this open position while the engine speed is less than a second predetermined speed of T. Upon attaining an engine speed T, the exhaust control valve is closed in a step S8.

With reference now to FIG. 12B, the exhaust control valve 138 is maintained in a closed position until the positioning of the exhaust control valve 138 is assumed by the control unit 174 based upon a desired mapping as described above. This occurs in a step S9.

The control of the exhaust valve 138 based upon the mapping continues until the engine is stopped. The control unit 174 inquires into the state of the engine operation in a step S10.

Once the engine 48 is stopped, a timer begins to count as described above in a step S11. Once the predetermined time interval has elapsed, the exhaust control valve 138 conducts a cleaning operation as described above (S-12). The cleaning operation continues until a second predetermined time interval has elapsed (S-13), at which time the drive control 170 is deactivated.

A graphical representation of this strategy is shown in FIG. 13. As identified, the exhaust control valve 138 begins in a closed position and is opened to an open position at a predetermined speed S. The exhaust control valve 138 is maintained in this open position until a speed of T is attained, at which time the exhaust control valve 138 is closed. The exhaust control valve 138 is then maintained in a closed position until a predetermined speed is attained.

Again in this strategy, a control map is utilized and varies depending upon the accelerating condition of the engine. For instance, if the engine is operating in a normal acceleration mode, then the exhaust control valve position preferably does not change until approximately 6000 rpm. However, if the engine speed is operating in a rapid acceleration mode, then the exhaust control valve positioning is altered preferably beginning at a speed of approximately 3500 rpm.

In this strategy, the end of the alteration of the exhaust control valve positioning occurs for both the rapid acceleration mode and the normal acceleration mode at approximately the same speed, which is approximately 6100 rpm.

As illustrated in FIG. 13, the exhaust control valve positioning is a function of the engine speed and the relationship between the two is altered at two different angles relative to the mode of acceleration. In other words, under rapid acceleration the exhaust control valve positioning is altered relative to the engine speed at an angle of $\alpha$ which is less than the angle $\beta$ at which the exhaust control valve positioning is altered under normal acceleration. This reflects the slower speed at which the positioning of the exhaust control valve may vary as compared to the more rapid variability of engine speed. For instance, because the engine speed can change more rapidly than the positioning of the exhaust control valve, it is desirable under rapid acceleration to begin to alter of position of the exhaust control valve at an earlier speed relative to normal acceleration. Thus, the angle $\alpha$ and the angle $\beta$ differ from rapid acceleration to normal acceleration.

A further strategy involves cycling the exhaust control valves 138 at a predetermined speed on either acceleration or deceleration. As illustrated at line 9-B of FIG. 8 and line 9-C of FIG. 9, the exhaust control valve 138 may be cycled at any time between the attainment of idle speed and the achievement of a predetermined pre-planing speed. The cycling of the valve 138 is indicative of the cleaning operation. In the illustrated embodiment, the pre-planing speed is defined as about 3500 rpm. The cycle of the exhaust control valve entails opening and closing the exhaust control valve in rapid succession for a predetermined number of cycles.

In accordance with the present invention, the exhaust clean operation is preferably performed while the engine is running, such as at an engine speed between the idle speed and that corresponding to a watercraft planing speed, after the engine has been started. In addition, the cleaning operation is performed at engine shutdown. The cleaning operation is beneficial in keeping the exhaust valves 138 free of harmful deposits. In this regard, it is noted that the valve cleaning operation may be performed at any speed of the engine less than a predetermined speed with such preferably performed at an engine speed less than the speed of the engine corresponding to a watercraft planing speed.

Although this invention has been described in terms of a certain embodiment, other embodiments apparent to those of ordinary skill in the art also are within the scope of this invention. Thus, various changes and modifications may be made without departing from the spirit and scope of the invention. Accordingly, the scope of the invention is intended to be defined only by the claims that follow.

What is claimed is:

1. A watercraft having an engine powering a water propulsion unit, the engine having a starter motor and an exhaust port leading from a combustion chamber through which port the exhaust products may be transported and an exhaust valve cooperable with the exhaust port and movable between a first position in which the closing of the exhaust port is delayed and a second position in which the closing of the exhaust port is advanced, the watercraft having a control unit powered by a power source and a drive control capable of moving the exhaust valve at least partially between the first position and the second position in an exhaust cleaning operation, the control unit activating the drive control after the starter motor is engaged and before the engine attains a first predetermined speed so as to cycle the exhaust control valve, and the control unit deactivating the drive control after the engine attains a second predetermined speed so as to disable controlled movement of the exhaust control valve.

2. The watercraft in accordance with claim 1, wherein the first predetermined speed is a pre-planing speed.

3. The watercraft in accordance with claim 1, wherein the first predetermined speed is lower than an idle speed.

4. The watercraft in accordance with claim 3, wherein the second predetermined speed is higher than an idle speed.

5. The watercraft in accordance with claim 4, wherein the second predetermined speed is lower than a planing speed.

6. The watercraft in accordance with claim 3, wherein the first predetermined speed is a speed attainable by the starter motor.

7. The watercraft in accordance with claim 6, wherein the cycle consists of moving the exhaust control valve from the second position to the first position.

8. A watercraft having an engine powering a water propulsion unit, the engine having a starter motor and an exhaust port leading from a combustion chamber through which port the exhaust products may be exhausted and an exhaust valve cooperable with the exhaust port and movable between a first position in which the closing of the exhaust port is delayed and a second position in which the closing of the exhaust port is advanced, the watercraft having a control unit in electrical communication with a drive control, the drive control capable of moving the exhaust valve at least partially between the first position and the second position in an exhaust cleaning operation, the control unit activating the drive control before the engine attains a first predetermined speed so as to cycle the exhaust control valve.

9. The watercraft in accordance with claim 8, wherein the first predetermined speed is a pre-planing speed.

10. The watercraft in accordance with claim 9, wherein the drive control moves the exhaust valve from the second position to the first position when the engine attains a speed greater than that attainable by the starter motor.

11. The watercraft in accordance with claim 8, wherein the drive control moves the exhaust valve from the first position to the second position if the engine has a speed less than that attainable by the starter motor.

12. The watercraft in accordance with claim 11, wherein the drive control moves the exhaust valve from the second position to the first position upon the engine attaining a predetermined pre-planing speed but before the engine attains a planing speed.

13. The watercraft in accordance with claim 11, wherein the drive control moves the exhaust valve from the second position to the first position during periods of rapid acceleration.

14. The watercraft in accordance with claim 8 further comprising a throttle angle sensor capable of detecting any position of an engine throttle, wherein the drive control moves the exhaust valve if the throttle angle sensor detects the throttle in a closed position for a predetermined period of time.

15. The watercraft in accordance with claim 14, wherein the drive control moves the exhaust valve from the first position to the second position.

16. An exhaust control for an exhaust valve of an internal combustion engine, the engine having at least one combustion chamber, an intake passage leading to the at least one combustion chamber, a fuel supply adapted to supply fuel to the combustion chamber, and an exhaust port leading from the combustion chamber, the valve cooperable with the exhaust port and movable between a first position in which the closing of the exhaust port is delayed and a second position in which the closing of the exhaust port is advanced, the exhaust control including means for moving the valve between the first and second position and control means for moving the valve in a cleaning operation at least partially between the first and second positions when the engine is running at a speed below a predetermined speed.

17. The exhaust control in accordance with claim 16, wherein the engine is utilized to power a watercraft and the predetermined speed is below a speed of the engine corresponding to a planing speed of the watercraft.

18. The exhaust control in accordance with claim 16, wherein the control means moves the valve in a cleaning operation when the engine speed is also above a predetermined low speed.

19. The exhaust control in accordance with claim 18, wherein the predetermined low speed comprises an idle speed of the engine.

20. The exhaust control in accordance with claim 19, wherein the control means moves the valve from the second position to the first position when the engine speed is above the predetermined low speed and the engine is in a period of rapid acceleration.

21. The exhaust control in accordance with claim 16, wherein the control means includes a normal valve operation mode in which the valve is moved based upon engine speed.

22. The exhaust control in accordance with claim 16, wherein the valve comprises a sliding knife-type valve.

23. The exhaust control in accordance with claim 16, wherein the control means moves the valve in an exhaust cleaning mode when the engine is shut off.

24. The exhaust control in accordance with claim 16, wherein after the cleaning operation the control means controls the valve in accordance with a mapped exhaust control strategy based at least partly on engine speed.

25. The exhaust control in accordance with claim 24, wherein when an engine speed falls below a predetermined low speed after control of the valve in accordance with the mapped strategy, the control means moves the valve in another cleaning operation.

26. An engine having at least one combustion chamber with an exhaust port leading therefrom, an exhaust port timing control valve provided in the port at an upper portion thereof, the valve being movable between a projected position wherein it is projected into the exhaust port and covers at least the upper portion of the exhaust port, and a retracted position in which it is retracted from the exhaust port, a drive control capable of moving the valve and a main control capable of controlling the drive control between on and off states, wherein the main control operates the drive control in a cleaning mode and a regular valve operation mode, and wherein the control unit initiates a valve cleaning mode in which the valve is moved between its projected and retracted positions by the drive control when a speed of the engine after starting exceeds a predetermined low speed but is below a predetermined high speed.

27. The engine in accordance with claim 26, wherein the engine includes a power supply and a main switch capable of controlling power flowing from the supply to the main control, and wherein the main control initiates the valve cleaning mode when the main switch is moved to an off position after the engine has been running.

28. The engine in accordance with claim 27, wherein the main control initiates the valve cleaning mode after a first predetermined period of time elapses.

29. The engine in accordance with claim 28, wherein the main control ceases the valve cleaning mode after a second predetermined period of time elapses.

30. The engine in accordance with claim 26, wherein the main control initiates a valve cleaning mode when a speed of the engine falls below a predetermined low speed.

31. The engine in accordance with claim 26, further including a motor capable of driving the valve and wherein the drive control controls the motor.

32. A method of cleaning an exhaust control valve of an engine having a lanyard switch, a start switch and at least one combustion chamber, an exhaust passage leading from the chamber and the exhaust control valve cooperating with the passage, the method comprising the steps of determining if the lanyard switch is in an on position, determining if the start switch is in the on position, determining if the engine speed exceeds a first predetermined speed, and if so, moving the valve in a cleaning operation between at least partially between a first position in which the valve does not obstruct the passage and a second position in which the valve at least partially obstructs the passage in order to clean the valve.

33. The method in accordance with claim 32, further including the step of determining if the engine is being shut off, and if so, moving the valve in the cleaning operation.

34. The method in accordance with claim 33, wherein the step of determining if the engine is being shut off further comprises determining whether the lanyard switch has been turned off.

35. The method in accordance with claim 33, wherein the step of determining if the engine is being shut off further comprises determining whether the engine speed is less than a second predetermined speed.

36. The method in accordance with claim 32, further including the step of determining if the engine is operating at a speed above the predetermined speed, and if so, controlling the valve in accordance with a mapped control strategy based at least partly on engine speed.

37. The method in accordance with claim 32, further including the step of determining if the throttle valve is in a closed position and if the throttle valve is maintained in the closed position, and if so, operating the valve in a cleaning operation.

38. The method in accordance with claim 37, further comprising the step of waiting a first predetermined time period upon the engine being shut-off and, at the end of the first predetermined time period, operating the valve in a cleaning operation.

39. The method in accordance with claim 38, further comprising operating the valve in the cleaning operation after the first predetermined time period for a second predetermined time period, and then stopping the cleaning operation.

40. The method in accordance with claim 32, further comprising opening the valve during engine starting prior to the engine attaining an ignition speed, and closing the valve following the engine attaining an idle speed.

* * * * *

UNITED STATES PATENT AND TRADEMARK OFFICE
CERTIFICATE OF CORRECTION

PATENT NO. : 6,227,922 B1
DATED : May 8, 2001
INVENTOR(S) : Nobuyuki Ochiai

It is certified that error appears in the above-identified patent and that said Letters Patent is hereby corrected as shown below:

<u>Title page,</u>
The Foreign Application Priority Data should be added for the following Japanese priority document
-- Oct. 15, 1996 (JP) ..............................................08-294365 --

Signed and Sealed this

Twenty-fifth Day of December, 2001

Attest:

JAMES E. ROGAN
*Attesting Officer*  *Director of the United States Patent and Trademark Office*